US012672142B2

(12) United States Patent
Zewail et al.

(10) Patent No.: US 12,672,142 B2
(45) Date of Patent: Jun. 30, 2026

(54) USER EQUIPMENT COLLISION HANDLING FOR MULTIPLE TRANSMISSION-RECEPTION POINT SCHEDULING

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 18/184,116

(22) Filed: Mar. 15, 2023

(65) Prior Publication Data

US 2024/0314785 A1     Sep. 19, 2024

(51) Int. Cl.
*H04W 72/20* (2023.01)
*H04L 5/00* (2006.01)
*H04W 72/12* (2023.01)

(52) U.S. Cl.
CPC ........... *H04W 72/20* (2023.01); *H04L 5/0035* (2013.01); *H04W 72/12* (2013.01)

(58) Field of Classification Search
CPC ..... H04W 72/04; H04W 72/12; H04W 72/20; H04L 5/0035
See application file for complete search history.

(56) References Cited

U.S. PATENT DOCUMENTS

| | | | | |
|---|---|---|---|---|
| 10,772,091 B2 * | 9/2020 | Luo | ............................ | H04L 1/18 |
| 2018/0132210 A1 * | 5/2018 | Rico Alvarino | ...... | H04L 5/0053 |
| 2019/0306846 A1 * | 10/2019 | Luo | ........................ | H04W 72/23 |
| 2021/0014026 A1 * | 1/2021 | Papasakellariou | .... | H04L 1/1861 |
| 2021/0136565 A1 * | 5/2021 | Saber | ............... | H04W 72/0446 |
| 2021/0273742 A1 * | 9/2021 | Xu | ......................... | H04L 1/0013 |
| 2022/0132526 A1 * | 4/2022 | Nam | .................... | H04L 5/0051 |
| 2022/0167415 A1 * | 5/2022 | Uziel | .................... | H04W 72/20 |
| 2023/0198719 A1 * | 6/2023 | Wang | .................... | H04L 5/0048 |
| | | | | 370/329 |
| 2023/0276451 A1 * | 8/2023 | Zhang | .................. | H04L 1/0046 |
| | | | | 370/329 |
| 2024/0048320 A1 * | 2/2024 | Sun | ........................ | H04L 5/0051 |

* cited by examiner

*Primary Examiner* — Jeong S Park
(74) *Attorney, Agent, or Firm* — Harrity & Harrity, LLP

(57) ABSTRACT

Systems, devices, and methods for handling scheduling collisions or conflicts in multi-transmission reception point (mTRP) communication scenarios are provided. A UE may receive indications for communicating two or more communications that would exceed or violate a UE capability or limitation. For example, a method of wireless communication performed by a UE comprises: receiving, from a first network node, a first mDCI indicating a first reserved resource; receiving, from a second network node, a second mDCI indicating a second reserved resource; refraining, based on the first reserved resource, the second reserved resource, and a capability of the UE, from communicating a first communication in the first reserved resource; communicating a second communication in the second reserved resource; and transmitting, based on the refraining, an indication that the UE did not communicate the first communication.

30 Claims, 10 Drawing Sheets

200
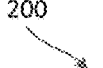
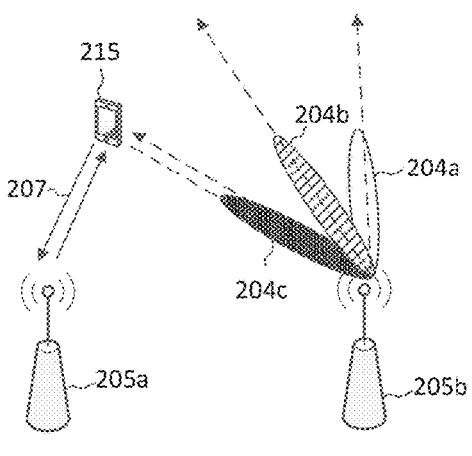
215
204b
204a
207
204c
205a
205b
FIG. 2
300
TRP1
mDCI
302
DL/UL
Resource 1
304
TRP2
mDCI
303
DL/UL
Resource 2
306
Time
FIG. 3

NETWORK NODE 600

Processor 602

MEMORY 604

Instructions 606 mTRP collision handling module 608

Transceiver 610

Modem 612

RF Unit 614

Antennas 616

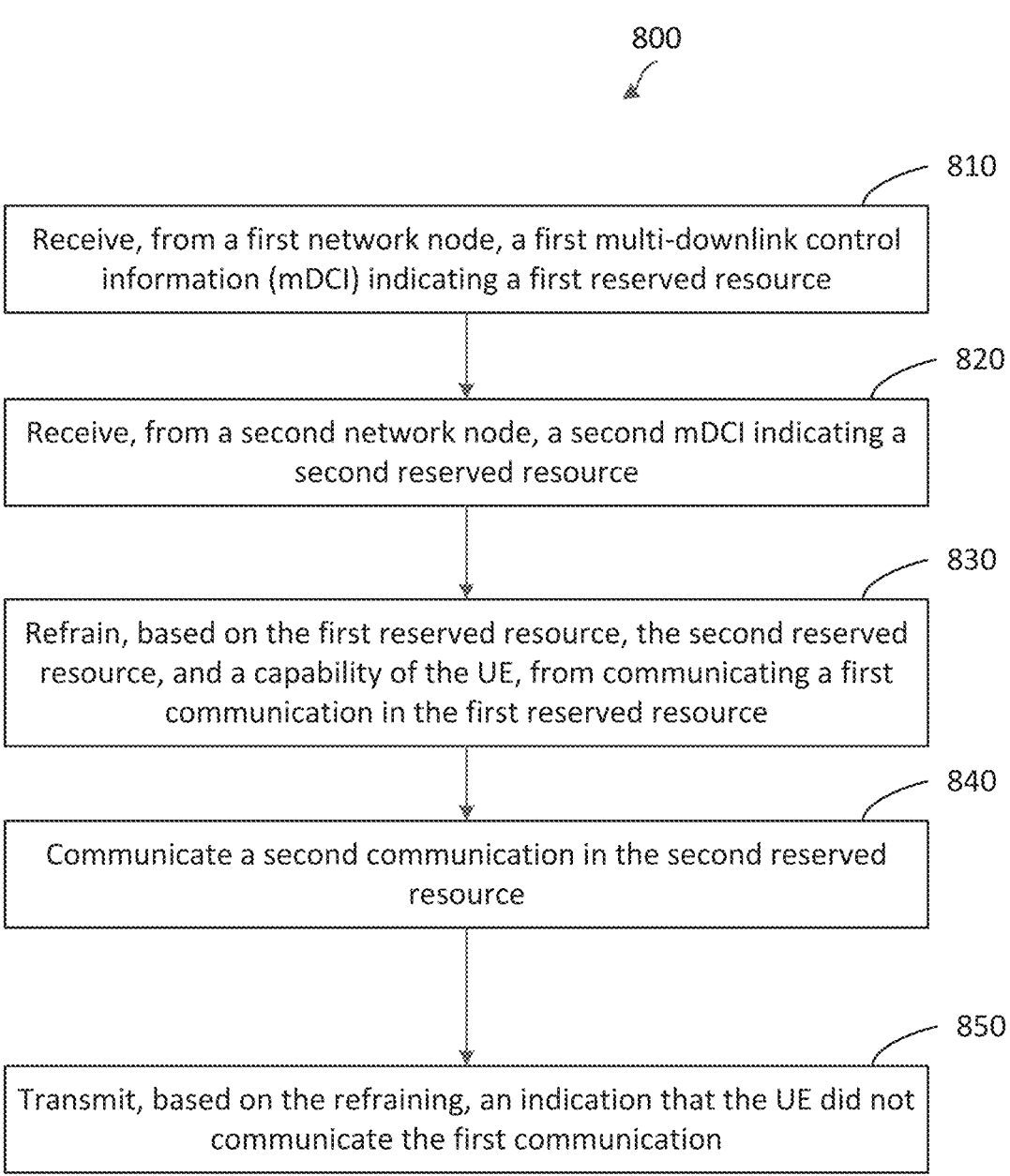

800

810

Receive, from a first network node, a first multi-downlink control information (mDCI) indicating a first reserved resource

820

Receive, from a second network node, a second mDCI indicating a second reserved resource

830

Refrain, based on the first reserved resource, the second reserved resource, and a capability of the UE, from communicating a first communication in the first reserved resource

840

Communicate a second communication in the second reserved resource

850

Transmit, based on the refraining, an indication that the UE did not communicate the first communication

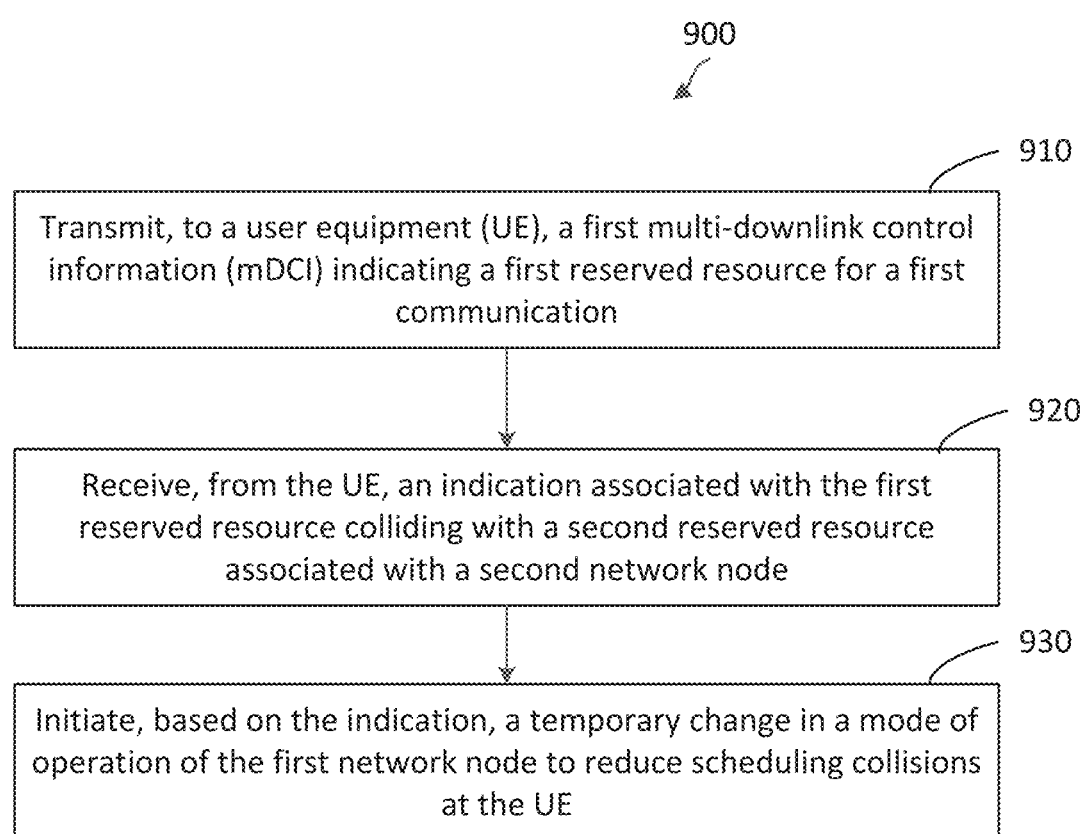

910

Transmit, to a user equipment (UE), a first multi-downlink control information (mDCI) indicating a first reserved resource for a first communication

920

Receive, from the UE, an indication associated with the first reserved resource colliding with a second reserved resource associated with a second network node

930

Initiate, based on the indication, a temporary change in a mode of operation of the first network node to reduce scheduling collisions at the UE

FIG. 9

USER EQUIPMENT COLLISION HANDLING FOR MULTIPLE TRANSMISSION-RECEPTION POINT SCHEDULING

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a multi-transmission-reception point (mTRP) communication scenario, a UE may be scheduled to communicate with one or more transmission reception points (TRPs). Using multiple TRPs for communications may extend overall transmission power available for downlink (DL) transmissions to a UE because the power from two network nodes (TRPs) can be combined. Further, the rank of a channel can be increased even in some circumstances where there are obstacles for line-of-sight propagation. In some aspects, the TRPs may be at different physical locations. In other aspects, the TRPs may be co-located. Although the TRPs may not be in the same location, the communications transmitted by the TRPs may be transmitted in a same logical cell, including the same frequency resources, for example. In single-downlink control information (DCI) mTRP communications, a DCI from one of the TRPs may schedule communications for each of a plurality of TRPs. In multi-DCI (mDCI) mTRP (mTRP) communications, each TRP may transmit DCI to the UE to schedule communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some instances, a user equipment (UE) is operating in a multi-transmission reception point (mTRP) communication scenario with two or more TRPs. Further, the TRPs may have limited scheduling coordination such that the different TRPs may not know whether the other TRP is scheduling a communication at the same UE that would conflict with its own UE scheduling. For example, the TRPs may indicated, configure, and/or otherwise schedule the UE with two conflicting uplink (UL) and/or downlink (DL) communications. The UL or DL communications may at least partially overlap in time, in frequency, or in both time and frequency. In some instances, the UE may not be capable of communicating the two mDCI-scheduled communications. For example, in some aspects, the UE may not be capable of receiving DL transmissions that overlap in time, or that overlap in frequency. In some instances, the UE may be configured with a maximum total rank for received DL transmissions within a period of time, and the two communications may exceed the maximum total rank. In another example, the UE may be configured with a maximum number of received transport blocks (TBs) for a period of time, and the two scheduled communications may exceed that capability. Such scenarios in which the two scheduled communications exceed one or more capabilities of the UE may be referred to as a scheduling collision, or simply, a collision. In this regard, for the purposes of the present disclosure, two communications exceed the capabilities of the UE if the UE comprises software limitations, hardware limitations, or other configurations or limitations that would prevent the UE from performing the two scheduled communications. In some aspects, the capabilities are specific to the UE's hardware and software configuration. In other aspects, the capabilities may be associated with a network configuration, or a protocol specified by a standard-setting body such as the third Generation Partnership Project (3GPP) and/or the European Telecommunications Standards Institute (ETSI). Further, the "UE capabilities" described herein include the abilities of the UE to perform a set of communications, as well as the limitations or inabilities for performing those communications. Accordingly, the UE capabilities contemplates any configuration or rule that influences or regulates whether the UE can perform multiple mTRP communications, and under what conditions those communications can be performed.

The present disclosure describes methods, mechanisms, and systems for handling collisions scheduled by mDCI from different TRPs in mTRP communication scenarios. Aspects of the present disclosure allow for flexibility in network asset deployment and configuration. For instance, according to some aspects of the present disclosure, some of the burden of collision handling may be delegated to the UEs such that the network nodes operating in mTRP scenarios can engage in less scheduling coordination. In this way, the network overhead decreases and individual UEs can manage collisions in a manner that is appropriate for their software and hardware configurations.

According to an aspect of the present disclosure, a method of wireless communication performed by a UE comprises: receiving, from a first network node, a first mDCI indicating a first reserved resource; receiving, from a second network node, a second mDCI indicating a second reserved resource; refraining, based on the first reserved resource, the second reserved resource, and a capability of the UE, from communicating a first communication in the first reserved resource; communicating a second communication in the second reserved resource; and transmitting, based on the refraining, an indication that the UE did not communicate the first communication.

According to another aspect of the present disclosure, a method of wireless communication performed by a first network node comprises: transmitting, a UE, a first mDCI indicating a first reserved resource for a first communication; receiving, from the UE, an indication associated with the first reserved resource colliding with a second reserved resource associated with a second network node; and initiating, based on the indication, a temporary change in a mode of operation of the first network node to reduce scheduling collisions at the UE.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

FIG. 2 illustrates a communication scenario with a reconfigurable intelligent surface according to some aspects of the present disclosure.

FIG. 3 is a diagram illustrating a multi-downlink control information (mDCI) scheduling collision in a multiple transmission-reception point (mTRP) communication scenario, according to aspects of the present disclosure.

FIG. 8 is a flow diagram of a wireless communication method performed by a UE according to some aspects of the present disclosure.

FIG. 9 is a flow diagram of a wireless communication method performed by a network unit according to some aspects of the present disclosure.

DETAILED DESCRIPTION

Figure 1A:
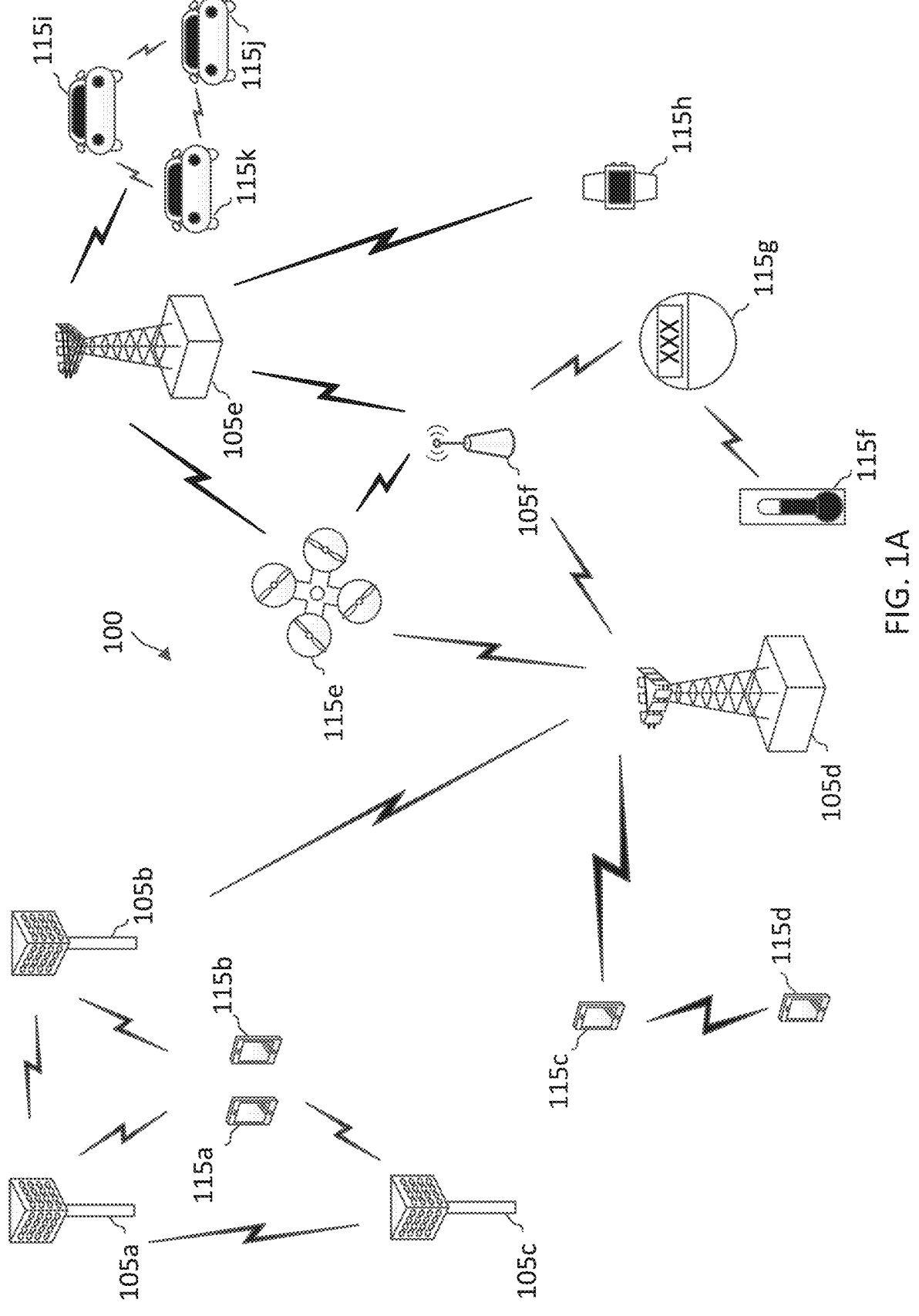
FIG. 1A illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into multiple different frequency ranges, a frequency range one (FR1), a frequency range two (FR2), and FR2x. FR1 bands include frequency bands at 7 GHz or lower (e.g., between about 410 MHz to about 7125 MHz). FR2 bands include frequency bands in mmWave ranges between about 24.25 GHz and about 52.6 GHz. FR2x bands include frequency bands in mmWave ranges between about 52.6 GHz to about 71 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/DL scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and downlink to meet the current traffic needs.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a multi-transmission-reception point (mTRP) communication scenario, a UE may be scheduled to communicate with one or more network nodes, referred to as transmission reception points (TRPs). In some aspects, the TRPs may be at different physical locations. In other aspects, the TRPs may be co-located. Although the TRPs may not be in the same location, the communications transmitted by the TRPs may be transmitted in a same logical cell, including the same frequency resources, for example. Transmitting from multiple network nodes for a single logical cell may offer several benefits, including increased signal power and channel rank, and better channel quality where physical obstacles may impede signals from at least one of the TRPs to the UE. In single-DCI mTRP communications, a DCI from one of the TRPs may schedule communications for each of a plurality of TRPs. In multi-DCI (mDCI) mTRP (mTRP) communications, each TRP may transmit DCI to the UE to schedule communications.

In some aspects, one or more of the serving cells may be configured for mDCI mTRP communications and one or more cells may be configured for single-DCI mTRP communications or single TRP communications. A cell may be configured for mDCI mTRP communications if the cell configuration indicates two control resource set (CORE-SET) pool index values and two timing advance groups (TAGs). For example, a mDCI mTRP cell may be configured with two CORESET pool index values and two TAG indicators. A single-DCI mTRP cell or single-TRP cell configuration may indicate a single TAG indicator and/or a single CORESET pool index value. When a cell is configured for mDCI mTRP communications, UL signals on the cell may be transmitted to one of multiple TRPs.

In mTRP communications, simultaneous DL and/or UL communications associated with different TRPs may be multiplexed by time domain multiplexing (TDM), frequency domain multiplexing (FDM), and/or spatial domain multiplexing (SDM). mDCI may be used to schedule physical downlink shared channel (PDSCH), physical downlink control channel (PDCCH), physical uplink shared channel (PUSCH), and/or physical uplink control channel (PUCCH) communications with one or more UEs. In spatial domain multiplexing, for example, a UE may use the same frequency and time resources to transmit and/or receive mTRP communications using distinct spatial filters for each communication. In some aspects, a spatial filter may refer to a scheme or configuration enabled for an array of antenna elements to adjust the phase of signals from each antenna element to create a focused beam oriented along a plane or axis. The process of phase shifting to create the focused beam may be referred to as beam forming. In some aspects, the UE may use two different spatial filters to transmit and/or receive communications simultaneously to different TRPs. In some aspects, the UE may use different antenna panels or antenna arrays to perform the simultaneous transmissions.

In some configurations, the network nodes (TRPs) communicating with a UE may coordinate DL and UL scheduling with the UE to limit or prevent scheduling conflicts, referred to as scheduling collisions. The TRPs may coordinate dynamically, which may involve or presume a fast backhaul connection between the TRPs. In other configurations, the TRPs may coordinate at a higher layer, such as the radio resource control (RRC) layer. For example, the TRPs may coordinate by scheduling in a TDM fashion, where some time domain resources are allocated for TRP1, and other time domain resources are allocated for TRP2. However, such coordination, whether dynamic or higher-level coordination, may result in performance limitations, such as a reduced trunking gain. Further, deployment of network nodes for mTRP communication that are capable of such coordination may be complex and costly. This may present a barrier or burden for network operators to deploy mTRP-capable network nodes in new areas.

According to aspects of the present disclosure, network nodes may be deployed for mTRP communications with reduced cross-mTRP scheduling coordination. Accordingly, the burden in some instances, a UE may receive two or more mDCIs from two or more corresponding TRPs scheduling UL and/or DL communications that would exceed the UE's capabilities. For instance, the scheduled communications may exceed the UE's capabilities for transmitting UL communications that overlap in the time domain, in the frequency domain, or in both the time domain and the frequency domain. In another example, the scheduled communications may exceed the UE's capabilities for receiving DL communications that overlap in the time domain, in the frequency domain, or in both the time domain and the frequency domain. In some aspects, the scheduled communications may exceed a configured limit for communications within a given time period, such as a limitation on rank, transport block (TB) size, or any other suitable limit. To handle or account for such scheduling collisions, the UE may be configured to determine or select one or more of the conflicting scheduled communications to drop. Dropping the communication may include or involve refraining from transmitting or receiving the dropped communication. Refraining from receiving, from instance, may include or involve refraining from monitoring for, decoding, or otherwise processing the dropped communication. In this way, the UE may assume at least a portion of the burden for scheduling collision handling, which may simplify deployment and reduce overhead on the network side.

According to some aspects, a method for collision handling may include a UE receiving a first mDCI scheduling a first communication in a first resource, and a second mDCI scheduling a second communication in a second resource. The first and second communications may include UL communications (e.g., PUCCH, PUSCH), DL communications (e.g., PDSCH, PDCCH), and/or a combination thereof. The first and second scheduled communications may result in a scheduling collision. In some aspects, a scheduling collision may refer to a scenario in which two scheduled communications exceed one or more UE communication capabilities. For instance, the UE's communication capabilities may not include the capability of receiving and/or transmitting communications that overlap in time, in frequency, or in both time and frequency. In another example, the UE's communication capabilities may include or involve a limitation on the UE to receive and/or transmit communications whose total aggregate rank exceeds a configured limit. In another example, the UE's communication capabilities may include or involve a limitation on the UE to receive individual communications whose individual rank exceeds a configured limit. Other UE capabilities and limitations thereof will be discussed in more detail below.

Based on the scheduled resources and the UE capability, the UE may select one of the communications and/or resources to drop. Selecting the communication and/or resource to drop may include refraining from communicating the communication for the selected resource. In this way, the UE may resolve the scheduling collision such that at least one of the communications may proceed in its scheduled resource. In another aspect, the UE may communicate an indication of the dropped communication to the TRP that scheduled the dropped communication. In some aspects, communicating the indication comprises transmitting an acknowledgement/non-acknowledgement (ACK/NACK) for the communication. For instance, the UE may transmit a NACK indicating that the UE did not receive a scheduled DL communication. In some aspects, the NACK may explicitly indicate that the UE dropped the scheduled DL communication. In other aspects, the NACK may not explicitly indicate that the UE dropped the scheduled DL communication. Instead, the network may determine or guess, based on the NACK and other network conditions, whether the DL communication was not received due to a scheduling communication with another TRP, or for some other reason. In some aspects, the UE may transmit an indication of the reason the UE dropped the scheduled communication. For example, the UE may transmit an indication of the UE capability limitation or configuration that was violated by the dropped communication.

In some aspects, based on the indication, the network node or TRP may adjust a communication operating mode or condition. The adjusting may include or involve initiating a temporary change in a mode of operation of the first network node to reduce scheduling collisions at the UE. In some aspects, the temporary change in the mode of operation may include initiating a temporary backoff window during which the TRP refrains from scheduling communications for the UE.

The systems, methods, and mechanisms described in the present disclosure offer several benefits. By reducing the demand on the network to coordinate mTRP communications with other TRPs, the overhead on the network side can be reduced, and deployment of TRP communications is simplified. Further, such a configuration may allow for greater flexibility in collision handling where UEs can manage scheduled mTRP communications according to their own capabilities. Accordingly, trunking gain may be increased, and the network may use available resources more efficiently.

FIG. 1A illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1A, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1A, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-action-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. an UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

Figure 1B:
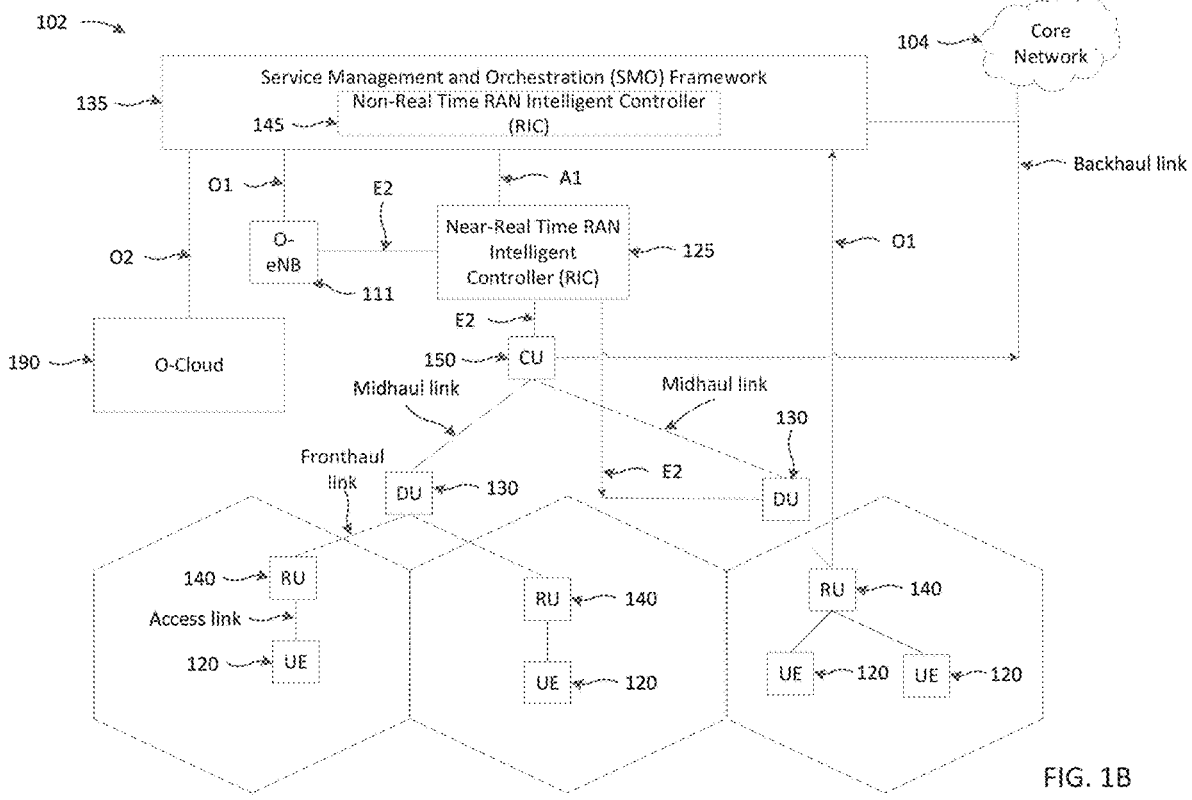
FIG. 1B is a diagram illustrating an example disaggregated BS architecture according to some aspects of the present disclosure.

FIG. 1B shows a diagram illustrating an example disaggregated base station 102 architecture. The disaggregated base station 102 architecture may include one or more central units (CUs) 150 that can communicate directly with a core network 104 via a backhaul link, or indirectly with the core network 104 through one or more disaggregated base station units (such as a Near-Real Time (Near-RT) RAN Intelligent Controller (RIC) 125 via an E2 link, or a Non-Real Time (Non-RT) RIC 145 associated with a Service Management and Orchestration (SMO) Framework 135, or both). A CU 150 may communicate with one or more distributed units (DUs) 130 via respective midhaul links, such as an F1 interface. The DUs 130 may communicate with one or more radio units (RUS) 140 via respective fronthaul links. The RUs 140 may communicate with respective UEs 120 via one or more radio frequency (RF) access links. In some implementations, the UE 120 may be simultaneously served by multiple RUs 140.

Each of the units, i.e., the CUS 150, the DUs 130, the RUs 140, as well as the Near-RT RICs 125, the Non-RT RICs 145 and the SMO Framework 135, may include one or more interfaces or be coupled to one or more interfaces configured to receive or transmit signals, data, or information (collec- tively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF trans- ceiver), configured to receive or transmit signals, or both, over a wireless transmission medium to one or more of the other units.

In some aspects, the CU 150 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 150. The CU 150 may be configured to handle user plane functionality (i.e., Central Unit-User Plane (CU-UP)), control plane functionality (i.e., Central Unit-Control Plane (CU-CP)), or a combination thereof. In some implementations, the CU 150 can be logically split into one or more CU-UP units and one or more CU-CP units. The CU-UP unit can communicate bidirec- tionally with the CU-CP unit via an interface, such as the E1 interface when implemented in an O-RAN configuration. The CU 150 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 130 may further host one or more low PHY layers. Each layer (or module) can be implemented with an interface configured to communicate signals with other layers (and modules) hosted by the DU 130, or with the control functions hosted by the CU 150.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access chan- nel (PRACH) extraction and filtering, or the like), or both, based at least in part on the functional split, such as a lower layer functional split. In such an architecture, the RU(s) 140 can be implemented to handle over the air (OTA) commu- nication with one or more UEs. In some implementations, real-time and non-real-time aspects of control and user plane communication with the RU(s) 140 can be controlled by the corresponding DU 130. In some scenarios, this configuration can enable the DU(s) 130 and the CU 150 to be implemented in a cloud-based RAN architecture, such as a vRAN archi- tecture.

The SMO Framework 135 may be configured to support RAN deployment and provisioning of non-virtualized and virtualized network elements. For non-virtualized network elements, the SMO Framework 135 may be configured to support the deployment of dedicated physical resources for RAN coverage requirements which may be managed via an operations and maintenance interface (such as an O1 inter- face). For virtualized network elements, the SMO Frame- work 135 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 150, DUs 130, RUs 140 and Near-RT RICs 125. In some implementations, the SMO Framework 135 can communicate with a hardware aspect of a 4G RAN, such as an open eNB (O-eNB) 111, via an O1 interface. Addi- tionally, in some implementations, the SMO Framework 135 can communicate directly with one or more RUs 140 via an O1 interface. The SMO Framework 135 also may include a Non-RT RIC 145 configured to support functionality of the SMO Framework 135.

The Non-RT RIC 145 may be configured to include a logical function that enables non-real-time control and opti- mization of RAN elements and resources, Artificial Intelli- gence/Machine Learning (AI/ML) workflows including model training and updates, or policy-based guidance of applications/features in the Near-RT RIC 125. The Non-RT RIC 145 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 150, one or more DUs 130, or both, as well as an O-eNB, with the Near-RT RIC 125.

In some implementations, to generate AI/ML models to be deployed in the Near-RT RIC 125, the Non-RT RIC 145 may receive parameters or external enrichment information from external servers. Such information may be utilized by the Near-RT RIC 125 and may be received at the SMO Frame- work 135 or the Non-RT RIC 145 from non-network data sources or from network functions. In some examples, the Non-RT RIC 145 or the Near-RT RIC 125 may be config- ured to tune RAN behavior or performance. For example, the Non-RT RIC 145 may monitor long-term trends and patterns for performance and employ AI/ML models to perform corrective actions through the SMO Framework 135 (such as reconfiguration via O1) or via creation of RAN management policies (such as A1 policies).

Referring again to FIG. 1A, in some aspects, one or more of the UEs 115 may be configured to communicate with two or more of the BSs 105 in a multi-transmission-reception point (mTRP) communication scenario. For example, a UE 115 may be configured with a first frequency band or cell, where the cell is configured for communications on more than one TRP. The UE 115 may receive DL communications (e.g., DCI, PDSCH, DL reference signals) from each TRP. The UE 115 may also transmit UL communications to one or more of the TRPs.

FIG. 2 illustrates a multiple transmission-reception point (mTRP) communication scenario 200 according to aspects of the present disclosure. The communication scenario 200 involves a first TRP 205a, a second TRP 205b, and a UE 215. In some aspects, one or both of the TRPs 205 may be one or more of the BSs 105 of the network 100. In other aspects, one or both of the TRPs 205 may be another type of wireless node or wireless communication device configured for communication with one or more UEs in a network. In some aspects, the UE 215 may be one of the UEs 115 of the network 100. For simplicity, FIG. 2 illustrates one UE 215 and two TRPs 205, but a greater number of UEs 215 (e.g., about 2, 3, 4, 5, 6, 7, 8, 9, 10, or more) and/or TRPs 205 (e.g., the about 2, 3, 4 or more) may be supported. In the scenario 200, the TRPs 205 and the UE 215 communicate with each other over at least one radio frequency band. For example, the TRPs 205 may be configured to communicate with the UE 215 on one or more cells corresponding to one or more frequency bands. In some aspects, each of the one or more cells corresponds to a component carrier (CC). In other aspects, each of the one or more cells corresponds to a bandwidth part (BWP). The one or more cells may include a primary cell (PCell) or special cell (SpCell).

In some aspects, one or both of the TRPs 205 may be capable of generating a number of directional transmission beams in a number of beam or spatial directions (e.g., about 2, 4, 8, 16, 32, 64 or more) and may select a certain transmission beam or beam direction to communicate with the UE 215 based on the location of the UE 215 in relation to the location of the TRPs 205 and/or any other environmental factors such as reflectors and/or scatterers in the surrounding. For example, the second TRP 205*b* may select a transmission beam that provides a best quality (e.g., with the highest receive signal strength) for transmission to the UE 215. The TRP 205*b* may also select a reception beam that provides a best quality (e.g., with the highest receive signal strength) for reception from the UE 215. As illustrated in FIG. 2, the TRP 205*b* may generate three beams 204*a*, 204*b*, and 204*c*. The TRP 205*b* may determine that it may utilize the beam 204*b* or the beam 204*c* to communicate with the UE 215, for example, based on a beam discovery or beam selection procedure.

As explained above, one or both of the TRPs 205 may schedule the UE 215 for an UL communication or a DL communication over a frequency band. For the purposes of the present disclosure, a frequency band may include a component carrier (CC) and/or a bandwidth part (BWP), for example. In single-DCI mTRP communications, a DCI from one of the TRPs (e.g., TRP 205*a*) may schedule communications for the first TRP 205*a* and the second TRP 205*b*. In multi-DCI (mDCI) mTRP communications, each TRP 205 may transmit DCI to the UE 215 to schedule communications. FIG. 2 may illustrate a mDCI mTRP communication scenario, whereby the first TRP 205*a* schedules DL and/or UL communications with the UE 215 by a first communication link 207, and the second TRP 205*b* schedules DL and/or UL communications with the UE 215 by a second communication link. In some aspects, a UE 215 may be configured with carrier aggregation to communicate with one or both of the TRPs 205 using one or more serving cells. The serving cells may include, for example, a primary cell (PCell), one or more secondary cells (SCells), a PUCCH secondary cell (PSCell), and/or a special cell (SpCell). In some aspects, one or more of the serving cells may be configured for mDCI mTRP communications, and one or more cells may be configured for single-TRP communications. A cell may be configured for mDCI mTRP communications if the cell configuration indicates two CORESET pool index values and two timing advance groups (TAGs). For example, a mDCI cell may indicate two CORESET-PoolIndex values and two TAG indicators. A single-TRP cell configuration may indicate a single TAG indicator and/or a single CORESETPoolIndex value.

In some aspects, a sDCI and/or a mDCI may be associated with a format, and may include one or more fields or parameters to indicate a UE with one or more parameters for a UL channel or communication. For example, a DCI may include frequency resource assignments, time resource assignments, beam-related parameters, power control parameters, and/or any other suitable or relevant information for the UE to transmit a UL communication in a UL channel. For example, DCI may indicate one or more TCI codepoints, TCI states, power control (PC) commands, frequency allocation of a scheduled UL communication, time allocation of a scheduled UL communication, antenna port indication, and/or any other relevant parameter for a UL communication. Further, RRC messages and/or media access control-control elements (MAC-CEs) may be used to configure or activate UL communications. In some aspects, a RRC message may configured one or more CORESET pool index values, TAGs, and/or any other cell configuration associated with a UL channel or configuration.

In some instances, a UE may be indicated and/or configured to transmit two UL communications to two different TRPs during a same time period. For example, the UE may be configured for SDM mTRP communication and the two UL communications may be scheduled or indicated during a same time period and using the same frequency resources. In another aspect, the communications may be scheduled for different portions of a same inter-band CC, for the UL communications may be scheduled for different CCs within a same band. However, in some instances, the two UL communications may not be capable of simultaneous transmission. For example, in some aspects, the UL communications may be indicated with different TCI states that are not capable of simultaneous transmission. In other aspects, the UL communications may be indicated with the same TCI state and overlapping frequency resources such that the two overlapping UL communications may not be simultaneously transmitted. The scheduling, indication, and/or activation of two UL channels during a same time period that are not capable of simultaneous transmission may be referred to as a collision, or scheduling collision.

FIG. 3 illustrates a mTRP scheduling collision scenario 300. The scenario 300 may illustrate communication links between a UE, a first TRP (TRP1), and a second TRP (TRP2). The UE may be configured for mTRP communications with both of TRP1 and TRP2. The dashed lines may refer to the communication links. In some aspects, the UE is configured to communicate with both TRPs using a single CC. In some aspects, the single CC may be intra-band (within a same frequency band), or inter-band (spanning two frequency bands). In other aspects, TRP1 may communicate with the UE using a first CC, and the TRP2 may communicate with the UE using a second CC, where the first CC and the second CC are in a same frequency band. In some aspects, the two TRPs may communicate with the UE using a same logical cell. In other aspects, TRP1 may communicate with the UE using a first cell (e.g., primary cell/special cell), and TRP2 may communicate with the UE using a second cell (e.g., secondary cell). In some aspects, the mTRP communication scenario may use frequency division multiplexing (FDM), time division multiplexing (TDM), or spatial division multiplexing (SDM).

The UE may receive, from TRP1, a first mDCI 302 scheduling a first communication in a first DL/UL resource 304. The UE may also receive, from TRP2, a second mDCI 303 scheduling a second communication in a second DL/UL resource 306. The scheduled resources 304, 306 may be UL or DL resources. For example, either of the resources may include resources for PUCCH, PUSCH, PDCCH, PDSCH, and/or any other suitable type of resource. In some aspects, both of the scheduled resources may be UL resources, or both of the scheduled resources may be DL resources. In other aspects, the scheduled resources may be a combination of DL and UL resources. The scheduled resources 304, 306 may overlap in time, in frequency, or both in time and frequency. In another aspect, the scheduled resources 304, 306 may occur within a same time window, whether or not they occupy any of the same time symbols and/or slot(s). In some aspects, each of the scheduled communications may be associated with a rank. Further, each of the scheduled communications may be associated with a transport block (TB) size.

As mentioned above, the UE may be configured with, or otherwise be associated with, one or more capabilities for communicating with multiple TRPs. In some aspects, the capability may include a capability for receiving communications from different TRPs that overlap in time, overlap in frequency, or overlap in both time and frequency. In some aspects, the UE capability may be limited such that the UE may not be able to receive mTRP communications that overlap in time, frequency, or in both time and frequency. In other aspects, the UE capability may be associated with a configured limitation for channel rank within a time window. In some aspects, the configured limitation may be a minimum channel rank. For instance, a UE may be capable of communicating two DL or UL communications at a same time, but only if the total aggregate rank of the time-overlapping communications is below the configured limit. In another example, the UE may be capable of communicating two DL or UL communications at a same time, but only if the rank of each of the time-overlapping communications is below a configured limit.

Figure 5A:
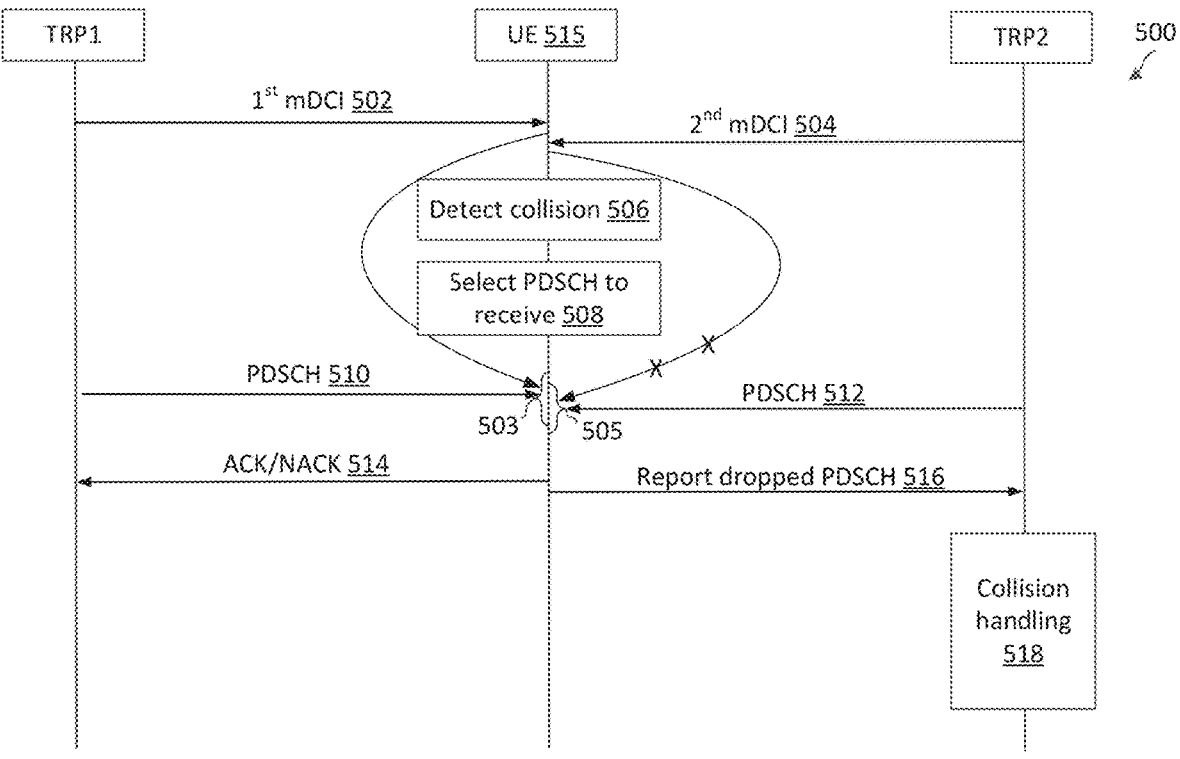
FIG. 5A is a signaling diagram of a multiple transmission-reception point (mTRP) communication method according to some aspects of the present disclosure.
Figure 5B:
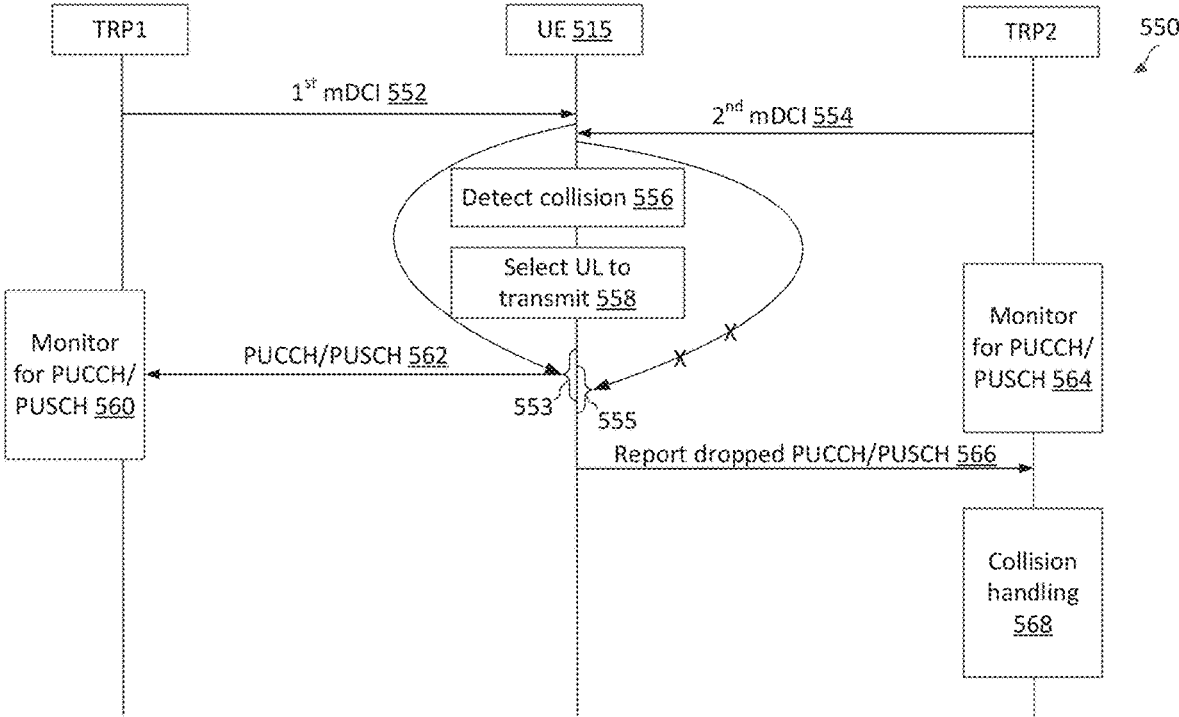
FIG. 5B is a signaling diagram of a multiple transmission-reception point (mTRP) communication method according to some aspects of the present disclosure.

The present disclosure describes methods, schemes, and mechanisms for UE scheduling collision handling for mTRP communication scenarios. In some aspects, network nodes operating as TRPs in a mTRP communication scenario may be permitted to transmit mDCIs scheduling a same UE with communications that would not be capable of receiving or transmitting the scheduled conflicting communications. In this way, the burden on the network for proactive scheduling coordination is reduced, which may simplify the network architecture and reduce barriers for new deployments. The UE may be configured to detect scheduling collisions for mTRP communications and handle or otherwise resolve the collision based on the UE's capabilities. For instance, the UE may select one of the scheduled communications to drop. Dropping the communication may include refraining from receiving or transmitting the dropped communication. In some aspects, the UE may report an indication of the dropped communication to the network. FIGS. 5A and 5B below are signaling diagrams illustrating methods for mTRP scheduling collision handling by a UE. FIG. 5A is a signaling diagram illustrating a method of mTRP collision handling for mDCI-scheduled UL communications. FIG. 5B is a signaling diagram illustrating a method of mTRP collision handling for mDCI-scheduled DL communications. Although the methods may occasionally be referred to as "UE collision handling," it will be understood that one or more network components, including one or more of the TRPs, may be involved with the collision handling mechanisms described herein.

Figure 4:
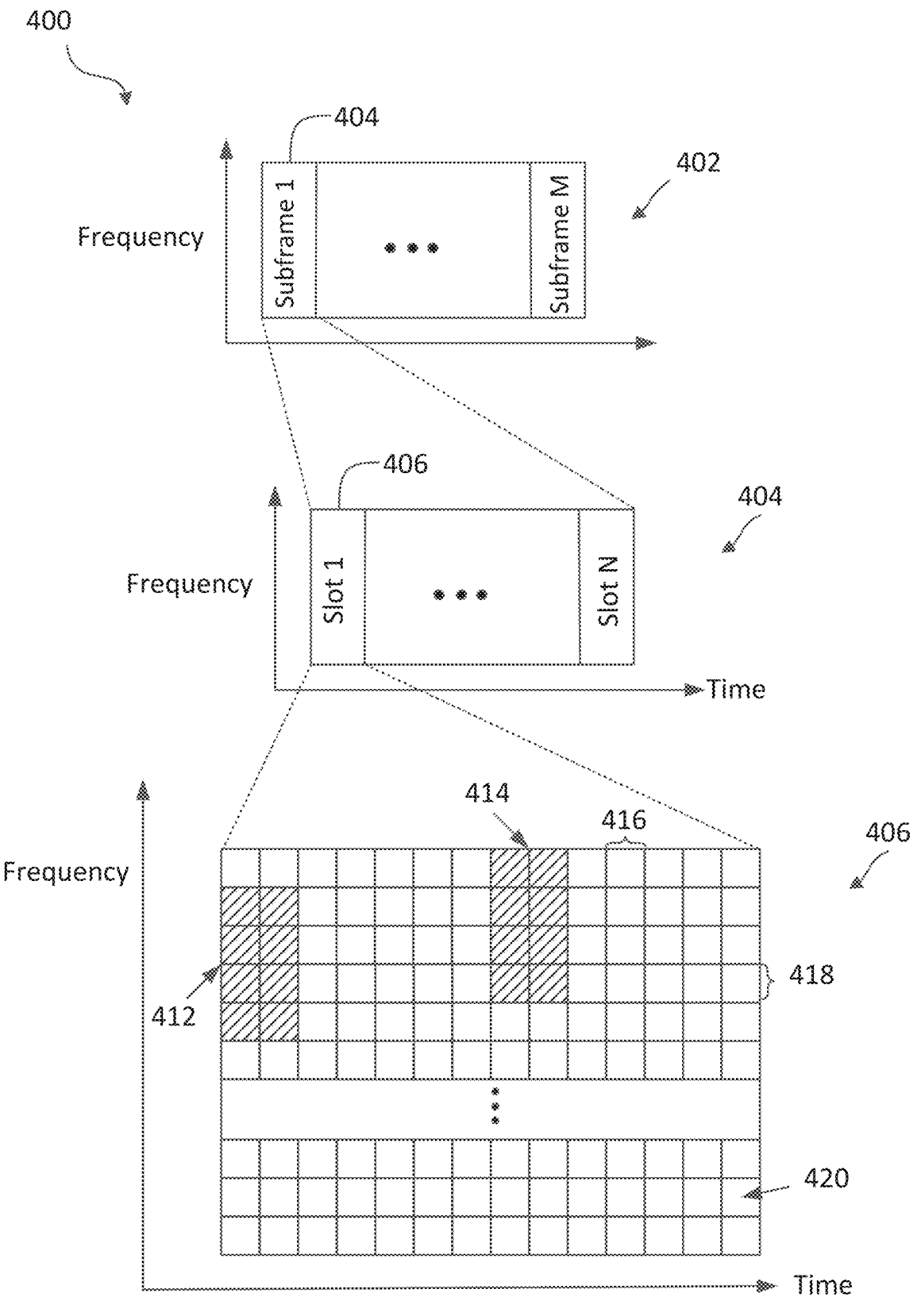
FIG. 4 illustrates a transmission frame for a communication network according to some embodiments of the present disclosure.

FIG. 4 is a timing diagram illustrating a transmission frame structure 400 according to some embodiments of the present disclosure. The transmission frame structure 400 may be employed by BSs such as the BSs 105 and UEs such as the UEs 115 in a network such as the network 100 for communications. In particular, the BS may communicate with the UE using time-frequency resources configured as shown in the transmission frame structure 400. In FIG. 4, the x-axes represent time in some arbitrary units and the y-axes represent frequency in some arbitrary units. The transmission frame structure 400 includes a radio frame 402. The duration of the radio frame 402 may vary depending on the embodiments. In an example, the radio frame 402 may have a duration of about ten milliseconds. The radio frame 402 includes M number of subframes 404, where M may be any suitable positive integer. In an example, M may be about 10.

Each subframe 404 may contain N slots 406, where N is any suitable positive number including 1. Each slot 406 includes a number of subcarriers 418 in frequency and a number of symbols 416 in time. The number of subcarriers 418 and/or the number of symbols 416 in a slot 406 may vary depending on the embodiments, for example, based on the channel bandwidth, the subcarrier spacing (SCS), and/or the cyclic prefix (CP) mode. One subcarrier 418 in frequency and one symbol 416 in time forms one resource element (RE) 420 for transmission.

A BS (e.g., BS 105 in FIG. 1A) may schedule a UE (e.g., UE 115 in FIG. 1A) for UL and/or DL communications at a time-granularity of slots 406. A BS 105 may schedule a UE 115 to monitor for PDCCH transmissions by instantiating a search space associated with a CORESET 412. The search space may also be instantiated with associated CORESET 414. Thus, as illustrated in the example of FIG. 4, there are two CORESETs, and therefore two monitoring occasions, within the slot 406 that are part of the search space the UE 115 monitors for control information from the BS 105.

While FIG. 4 illustrates two CORESETs, 412 and 414, for purposes of simplicity of illustration and discussion, it will be recognized that embodiments of the present disclosure may scale to many more CORESETs, for example, about 3, 4 or more. Each CORESET may include a set of resources spanning a certain number of subcarriers 418 and a number of symbols 416 (e.g., about 1, 2, or 3) within a slot 406. As an alternative to multiple different CORESETs within a slot 406, one or more of the many CORESETs may be in a different slot than the others. Each CORESET has an associated control channel element (CCE) to resource element group (REG) mapping. A REG may include a group of REs 420. The CCE defines how DL control channel data may be transmitted.

A BS 105 may configure a UE 115 with one or more search spaces by associating a CORESET 412 with a starting position (e.g., a starting slot 406), a symbol 416 location within a slot 406, a periodicity or a time pattern, and candidate mapping rules. For examples, a search space may include a set of candidates mapped to CCEs with aggregation levels of 1, 4, 4, 8, and/or 12 CCEs. As an example, a search space may include the CORESET 412 starting at the first symbol 416 indexed within a starting slot 406. The search space may also include the CORESET 414 starting at a later symbol index within the starting slot 406. The exemplary search space may have a periodicity of about five slots and may have candidates at aggregation levels of 1, 4, 4, and/or 8.

The UE 115 may perform blind decoding in the search spaces to search for DL control information (e.g., slot format information and/or scheduling information) from the BS. In some examples, the UE may search a subset of the search spaces based on certain rules, for example, associated with the UE's channel estimation and/or blind decoding capabilities. One such example of DL control information the UE 115 may be blind decoding for is a PDCCH from the BS 105.

As shown in FIG. 4, CORESET 412 and CORESET 414 may be at different frequencies from each other. The CORE-SETs can be non-contiguous as shown, or they may be contiguous. The frequency ranges of CORESET 412 and CORESET 414 may overlap or not (e.g., as illustrated in FIG. 4, the frequency ranges partially overlap, and therefore are different from each other). In some aspects, the frequency offset between the CORESETs is a multiple of six RBs, or some other offset. According to the example of FIG. 4, each of CORESET 412 and CORESET 414 may carry a different PDCCH transmission (or none at all, though part of the search space for the UE 115). CORESET 412 and CORESET 414 can have other characteristics which are different from each other than just frequency (or instead of frequency). For example, they can differ in CCE-to-REG mapping and/or REG bundling. Or, they can also be associated with different TCI states, thereby being associated with different beams. In addition, the CCE index of a PDCCH monitoring occasion may be different across CORESETs. Other forms of diversity between CORESETs could be achieved as well, including some combination of differing characteristics (such as all of the above differences together or a subset thereof).

FIG. 5A is a signaling diagram illustrating a mTRP communication method 500 according to some aspects of the present disclosure. The method 500 is employed by a first TRP (TRP1), a second TRP (TRP2), and a UE 515. In some aspects, one or both of the TRPs may be one of the BSs 105 in the network 100. In other aspects, one or both of the TRPs may be another type of wireless node or connection point. In some aspects, the TRPs may be referred to as network devices or network entities. In some aspects, one or both of the TRPs may include an aggregated BS and/or one or more portions of a disaggregated BS, as described above with respect to FIG. 1B. In some aspects, the UE 515 may be one of the UEs 115 of the network 100. The UE 515 may be configured for mTRP communications with both TRP1 and TRP2. However, it will be understood that the UE 515 may be configured for mTRP communications with more than two TRPs, including three, four, five, six, and/or any other suitable number of TRPs.

As explained above, the UE 515 may be configured for single-DCI (sDCI) mTRP communications, or multi-DCI (mDCI) mTRP communications. In mDCI mTRP communications, the UE 515 may receive scheduling DCIs from each of TRP1 and TRP2 for DL and/or UL communications with each respective TRP. In some aspects, the UE 515 is configured to communicate with both TRPs using a single CC. In some aspects, the single CC may be intra-band (within a same frequency band), or inter-band (spanning two frequency bands). In other aspects, TRP1 may communicate with the UE using a first CC, and the TRP2 may communicate with the UE using a second CC, where the first CC and the second CC are in a same frequency band. In some aspects, the two TRPs may communicate with the UE 515 using a same logical cell. In other aspects, TRP1 may communicate with the UE 515 using a first cell (e.g., primary cell/special cell of a first physical cell index), and TRP2 may communicate with the UE 515 using a second cell (e.g., secondary cell of a second physical cell index). In some aspects, the mTRP communication scenario may use frequency division multiplexing (FDM), time division multiplexing (TDM), or spatial division multiplexing (SDM).

At action 502, the UE 515 receives, from TRP1, a first mDCI scheduling a first DL communication scheduled for a first time period 503. In some aspects, the first mDCI may schedule the first DL communication for the first time period 503 on a first set of frequency resources. In an exemplary aspect, the first DL communication may comprise a first physical downlink shared channel (PDSCH) communication. In another aspect, the first DL communication may comprise a first physical downlink control channel (PDCCH) communication. The DL communication may comprise, or be associated with, a rank. In some aspects, the rank may me associated with an integer value. For instance, the rank may be a value ranging from 1 to 8. In some aspects, the rank may be associated with a number of subchannels or layers for the communication. In another aspect, the DL communication may comprise, or may be associated with, a transport block size (TBS). The TBS may be based on or associated with a number of parameters, including the number of layers of the channel, and the number of resource blocks (RBs) used for the transmission. In some aspects, the TBS may be indicated by an index. For instance, in some aspects, an index of 93 may indicate a TBS of 3824. In some aspects, an index of 1 may indicate a TBS of 24.

In some aspects, the first mDCI may indicate a first TCI state and the DL transmission using a first TRP (e.g., TRP1). In some aspects, a same field of the first mDCI may indicate both the first TCI state and the DL transmission for the TRP1. In other aspects, a second communication or indication may indicate the first TCI state. In some aspects, the method 500 may further include the UE 515 receiving a RRC configuration indicating a CORESET Pool Index, and the CORESET Pool Index value may be associated with TRP1.

At action 504, the UE 515 receives, from TRP2, a second mDCI scheduling a second DL communication scheduled for a second time period 505. In the illustrated example, the second time period 505 at least partially overlaps with the first time period 503. For instance, both the first DL communication and the second DL communication may occupy one or more of the same symbols, slots, and/or subframes. In other aspects, the first time period 503 may not overlap in time with the second time period 505. In some aspects, the first time period 503 and the second time period 505 do not overlap in time but both occur within a same time period. In some aspects, the time period may be a configured time window.

In some aspects, the second mDCI may schedule the second DL communication for the second time period 505 on the first set of frequency resources. In other aspects, the second mDCI may schedule the second DL communication for the second time period 505 on a second set of frequency resources different from the first set of frequency resources. The second set of frequency resources may at least partially overlap with the first set of frequency resources. In other aspects, the second set of frequency resources may not overlap with the first set of frequency resources. In some aspects, the second set of frequency resources is in a same CC, a same subband, and/or a same frequency interlace as the first frequency resources. In other aspects, the second set of frequency resources is in a different CC, a different subband, and/or a different frequency interlace than the first frequency resources.

In an exemplary aspect, the second DL communication may comprise a second PDSCH communication. In another aspect, the second DL communication may comprise a second PDCCH communication. The second DL communication may comprise, or be associated with, a rank. In another aspect, the second DL communication may comprise, or may be associated with, a TBS. In some aspects, the TBS for the second DL communication may be the same as the TBS for the first DL communication. In another aspect, the TBS for the second DL communication may be different than the TBS for the first DL communication.

Based on the first and second DL communications scheduled by the mDCIs at actions 502 and 504, and based on one or more capabilities of the UE 515, the first and second DL communications may collide or otherwise conflict. At action 506, the UE 515 detects the collision between the first DL communication and the second DL communication. In some aspects, a scheduling collision refers to a scenario where two communications scheduled for the UE 515 would exceed the UE 515's capabilities for transmission and/or reception. In some aspects, the capabilities are associated with configured limits or rules that prevent the UE 515 from multiple communications that coincide in time and/or frequency. In some aspects, the UE 515's capabilities may include, or may be associated with, a capability for receiving two or more DL communications that overlap in time. For instance, in some aspects, a UE's capabilities may not include a capability for receiving two DL communications that overlap in time. In other aspects, the UE 515 may have a capability to receive time-overlapping DL communications subject to one or more conditions or limitations. For instance, the UE 515 may be configured to receive time-overlapping DL communications provided that the rank of each communication satisfies a configured limitation. In another example, the UE 515 may be configured to receive time-overlapping DL communications provided that the total aggregate rank of the time-overlapping communications satisfies a configured limitation. In some aspects, the UE 515 may be configured with a maximum rank for each communication received within a time period. In another aspect, the UE 515 may be configured with a maximum total, or aggregate, rank for all communications received within a time period.

In another example, the UE 515 may be capable of receiving time-overlapping DL communications provided that each communication satisfies a configured transport block size (TBS) limitation. In another aspect, the UE 515 may be capable of receiving time-overlapping DL communications provided that that the combined TBS of the time-overlapping communications satisfies a configured combined TBS limitation. In some aspects, the TBS limitation may be referred to as a maximum DL transmission TBS capability.

The first DL communication and second DL communication may collide such that the UE 515 would not be capable of receiving both DL communications based on one of the UE capabilities and limitations described above. Accordingly, action 506 may include determining that the first DL communication and second DL communication exceed one or more of the UE capabilities described above.

At action 508, based on the UE 515 detecting a collision of the first and second DL communications, the UE 515 selects one of the DL communications to receive, and one of the DL communications to drop. Dropping the DL communication may include refraining from monitoring, decoding, or otherwise receiving the DL communication. In the illustrated embodiment, the DL communications are PDSCH communications. However, it will be understood that the DL communications may include PDCCH communications, and/or any other suitable DL communication.

In some aspects, the UE 515 selects which DL communication to receive, and/or which DL communication to drop, based on the resources associated with each DL communication. In the illustrated embodiment, the UE 515 selects the first PDSCH scheduled for the first time period

503. The UE 515 may select the first PDSCH based on the first mDCI being received first. In another aspect, the UE 515 may select the first PDSCH based on the time period 503 beginning earlier than the time period 505. In other aspects, the UE 515 may select which DL communication to receive and which to drop based on a rank, TBS, or priority associated with the scheduled DL communications. In another aspect, a combination of the criteria described above. For instance, the UE 515 may select which DL communication to receive and/or which DL communication to drop based on a combination of the order in which the mDCI were received, the order of the time periods 503, 505, channel rank, TBS, and/or priority associated with the DL communications.

At action 510, TRP1 transmits, and the UE 515 receives, the first PDSCH scheduled by the first mDCI in the first time period 503. At action 512, TRP2 transmits, and the UE 515 refrains from receiving, the second PDSCH scheduled by the second mDCI in the second time period 505. Action 512 may be described as the UE 515 dropping the second PDSCH. Accordingly, the UE 515 may refrain from monitoring for and decoding the second PDSCH.

At action 514, the UE 515 transmits, and TRP1 receives, an ACK/NACK indicating whether the first PDSCH was properly received by the UE 515. In some aspects, action 514 may comprise the UE transmitting a PUCCH communication including HARQ-ACK feedback.

At action 516, the UE 515 transmits, and TRP2 receives, an indication that the second PDSCH was dropped by the UE 515. In some aspects, transmitting the indication may comprise transmitting a NACK indicating that the second PDSCH was not received. In some aspects, transmitting the indication at action 516 comprises transmitting a PUCCH communication, such as a format 0 PUCCH or a format 2 PUCCH. However, any suitable uplink communication may be used, including format 1, 3, and 4 PUCCH to report the indication. In other embodiments, action 516 may comprise the UE 515 using higher-layer signaling to transmit the indication, such as a RRC message or a media access control-control element (MAC-CE). In some aspects, a specialized PUCCH format may be used, where the PUCCH format includes at least one field indicating that the UE 515 dropped the second PDSCH. In some aspects, the PUCCH may include at least one field indicating which UE capability was associated with the UE 515's decision to drop the second PDSCH. In some aspects, the indication comprises a NACK indicating a DL scheduling collision for the second PDSCH.

At action 518, TRP2 performs a collision handling procedure. In some aspects, action 518 includes TRP2 initiating a temporary change in a mode of operation. For instance, the temporary change in the mode of operation may be a communication operation mode, In some aspects, the temporary change in the mode of operation comprises a backoff window for scheduling DL communications with the UE 515. In some aspects, the temporary change in the mode of operation comprises initiating a dynamic coordination with TRP1 for scheduling mTRP DL communications with the UE 515. Accordingly, the network, via the TRPs, may adapt to reduce or mitigate further scheduling collisions with the UE 515 based on the UE 515's indication of the scheduling collision.

Referring to actions 516 and 518, in some aspects, the indication provided by the UE 515 may explicitly or implicitly indicate the collision. For instance, the indication may comprise a standardized PUCCH communication or MAC-CE indicating that the second PDSCH was not received, but may not explicitly indicate that the second PDSCH was not received because of a scheduling collision. Accordingly, TRP2 and/or another network unit may determine or infer, based on the UE's implicit indication, that the second PDSCH was not received due to scheduling collisions. In other aspects, the indication from the UE 515 may explicitly indicate the scheduling collision.

FIG. 5B is a signaling diagram illustrating a mTRP communication method 550 according to some aspects of the present disclosure. The method 550 is employed by a first TRP (TRP1), a second TRP (TRP2), and a UE 515. In some aspects, one or both of the TRPs may be one of the BSs 105 in the network 100. In other aspects, one or both of the TRPs may be another type of wireless node or connection point. In some aspects, the TRPs may be referred to as network devices or network entities. In some aspects, one or both of the TRPs may include an aggregated BS and/or one or more portions of a disaggregated BS, as described above with respect to FIG. 1B. In some aspects, the UE 515 may be one of the UEs 115 of the network 100. The UE 515 may be configured for mTRP communications with both TRP1 and TRP2. However, it will be understood that the UE 515 may be configured for mTRP communications with more than two TRPs, including three, four, five, six, and/or any other suitable number of TRPs.

In some aspects, the UE 515 is configured to communicate with both TRPs using a single CC. In some aspects, the single CC may be intra-band, or inter-band. In other aspects, TRP1 may communicate with the UE using a first CC, and the TRP2 may communicate with the UE using a second CC, where the first CC and the second CC are in a same frequency band. In some aspects, the two TRPs may communicate with the UE 515 using a same logical cell. In other aspects, TRP1 may communicate with the UE 515 using a first cell (e.g., primary cell/special cell of a first physical cell index), and TRP2 may communicate with the UE 515 using a second cell (e.g., secondary cell of a second physical cell index). In some aspects, the mTRP communication scenario may use FDM, TDM, and/or SDM.

At action 552, the UE 515 receives, from TRP1, a first mDCI scheduling a first UL communication scheduled for a first time period 553. In some aspects, the first mDCI may schedule the first UL communication for the first time period 553 on a first set of frequency resources. In one aspect, the first UL communication may comprise a first PUSCH communication. In another aspect, the first UL communication may comprise a first PUCCH communication. The UL communication may comprise, or be associated with, a rank. In some aspects, the rank may me associated with an integer value. For instance, the rank may be a value ranging from 1 to 8. In some aspects, the rank may be associated with a number of subchannels or layers for the communication. In another aspect, the UL communication may comprise, or may be associated with, a TBS. The TBS may be based on or associated with a number of parameters, including the number of layers of the channel, and the number of RBs used for the transmission. In some aspects, the TBS may be indicated by an index. For instance, in some aspects, an index of 93 may indicate a TBS of 3824. In some aspects, an index of 1 may indicate a TBS of 24.

In some aspects, the first mDCI may indicate a first TCI state and the DL transmission using a first TRP (e.g., TRP1). In some aspects, a same field of the first mDCI may indicate both the first TCI state and the DL transmission for the TRP1. In other aspects, a second communication or indication may indicate the first TCI state. In some aspects, the method 550 may further include the UE 515 receiving a RRC configuration indicating a CORESET Pool Index, and the CORESET Pool Index value may be associated with TRP1.

At action 554, the UE 515 receives, from TRP2, a second mDCI scheduling a second UL communication scheduled for a second time period 555. The second UL communication may comprise a PUSCH, a PUCCH, and/or any suitable type of UL communication. In the illustrated example, the second time period 555 at least partially overlaps with the first time period 553. For instance, both the first UL communication and the second UL communication may occupy one or more of the same symbols, slots, and/or subframes. In other aspects, the first time period 553 may not overlap in time with the second time period 555. In some aspects, the first time period 553 and the second time period 555 do not overlap in time but both occur within a same time period. In some aspects, the time period may be a configured time window.

In some aspects, the second mDCI may schedule the second UL communication for the second time period 555 on the first set of frequency resources. In other aspects, the second mDCI may schedule the second UL communication for the second time period 555 on a second set of frequency resources different from the first set of frequency resources. The second set of frequency resources may at least partially overlap with the first set of frequency resources. In other aspects, the second set of frequency resources may not overlap with the first set of frequency resources. In some aspects, the second set of frequency resources is in a same CC, a same subband, and/or a same frequency interlace as the first frequency resources. In other aspects, the second set of frequency resources is in a different CC, a different subband, and/or a different frequency interlace than the first frequency resources.

In an exemplary aspect, the second UL communication may comprise a second PUSCH communication. In another aspect, the second UL communication may comprise a second PUCCH communication. The second UL communication may comprise, or be associated with, a rank. In another aspect, the second UL communication may comprise, or may be associated with, a TBS. In some aspects, the TBS for the second UL communication may be the same as the TBS for the first UL communication. In another aspect, the TBS for the second UL communication may be different than the TBS for the first UL communication.

Based on the first and second UL communications scheduled by the mDCIs at actions 552 and 554, and based on one or more capabilities of the UE 515, the first and second UL communications may collide or otherwise conflict. At action 556, the UE 515 detects the collision. In some aspects, the UE 515's capabilities may include, or may be associated with, a capability for transmitting two or more UL communications that overlap in time. For instance, in some aspects, a UE's capabilities may not include a capability for transmitting two PUCCH communications that overlap in time. In some aspects, a UE's capabilities may not include a capability for transmitting two PUSCH communications that overlap in time. In some aspects, a UE's capabilities may not include a capability for transmitting a PUSCH communication and a PUCCH communication that overlap in time In other aspects, the UE 515 may have a capability to transmitting time-overlapping PUSCH communications subject to one or more conditions or limitations. For instance, the UE 515 may be configured to transmit time-overlapping PUSCH communications provided that the rank of each communication satisfies a configured limitation. In another example, the UE 515 may be configured to transmit time-overlapping PUSCH communications provided that the total aggregate rank of the time-overlapping PUSCH communications satisfies a configured limitation. In some aspects, the UE 515 may be configured with a maximum rank for each PUSCH communication transmitted within a time period. In another aspect, the UE 515 may be configured with a maximum total, or aggregate, rank for all PUSCH communications transmitted within a time period. In some aspects, the rank limitation may be referred to as a PUSCH transmission rank capability.

In another example, the UE 515 may be capable of transmitting time-overlapping PUSCH communications provided that each communication satisfies a configured TBS limitation. In another aspect, the UE 515 may be capable of transmitting time-overlapping PUSCH communications provided that that the combined TBS of the time-overlapping communications satisfies a configured combined TBS limitation. In some aspects, the TBS limitation may be referred to as a maximum DL transmission TBS capability. In another aspect, the UE 515 may be capable of transmitting two PUSCH communications provided that the two PUSCH communications have no overlap in the frequency domain.

The first PUCCH/PUSCH communication and second PUCCH/PUSCH communication may collide such that the UE 515 would not be capable of transmitting both PUCCH/PUSCH communications based on one of the UE capabilities and limitations described above. Accordingly, action 556 may include determining that the first PUCCH/PUSCH communication and second PUCCH/PUSCH communication exceed one or more of the UE capabilities described above.

At action 558, based on the UE 515 detecting a collision of the first and second UL communications, the UE 515 selects one of the PUCCH/PUSCH communications to transmit, and one of the PUCCH/PUSCH communications to drop.

In some aspects, the UE 515 selects which PUCCH/ PUSCH communication to transmit, and/or which PUCCH/ PUSCH communication to drop, based on the resources associated with each UL communication. In the illustrated embodiment, the UE 515 selects the first PUCCH/PUSCH scheduled for the first time period 553. The UE 515 may select the first PUCCH/PUSCH based on the first mDCI being received first. In another aspect, the UE 515 may select the first PUCCH/PUSCH based on the time period 553 beginning earlier than the time period 555. In other aspects, the UE 515 may select which PUCCH/PUSCH communication to transmit and which to drop based on a rank, TBS, or priority associated with the scheduled PUCCH/PUSCH communications. In another aspect, the UE 515 may prioritize PUCCH communications over PUSCH communications. In another aspect, the UE 515 may prioritize PUSCH communications over PUCCH communications. In another aspect, the UE 515 may prioritize one of the UL communications based on its content. For example, the UE 515 may prioritize a PUCCH communication carrying HARQ-ACK feedback over a PUSCH communication. In another aspect, the UE 515 may prioritize a PUSCH communication having a priority index that meets or exceeds a given threshold over a PUCCH communication.

In another aspect, a combination of the criteria described above. For instance, the UE 515 may select which UL communication to transmit and/or which UL communication to drop based on a combination of the order in which the mDCI were received, the order of the time periods 553, 555, channel rank, TBS, UL communication content, and/or priority associated with the DL communications.

At action 560, TRP1 monitors for the first PUCCH/ PUSCH communication based on the scheduled resources from the first mDCI. At action 562, the UE 515 transmits, and TRP1 receives, the first PUCCH/PUSCH scheduled by the first mDCI in the first time period 553.

At action 564, TRP2 monitors for the second PUCCH/ PUSCH communication based on the scheduled resources from the second mDCI. However, the UE 515 refrains from transmitting the second PUCCH/PUSCH based on the selection at action 558.

At action 566, the UE 515 transmits, and TRP2 receives, an indication that the second PUCCH/PUSCH was dropped by the UE 515. The indication may be implicit, or explicit. In some aspects, transmitting the indication may comprise transmitting a third PUCCH communication, such as a format 0 PUCCH or a format 2 PUCCH. However, any suitable UL communication may be used, including format 1, 3, and 4 PUCCH to report the indication. In other embodiments, action 566 may comprise the UE 515 using higher-layer signaling to transmit the indication, such as a RRC message or a media access control-control element (MAC-CE). In some aspects, a specialized PUCCH format may be used, where the PUCCH format includes at least one field indicating that the UE 515 dropped the second PUCCH/PUSCH. In some aspects, the third PUCCH may include at least one field indicating which UE capability was associated with the UE 515's decision to drop the second PUCCH/PUSCH.

At action 568, TRP2 performs a collision handling procedure. In some aspects, action 568 includes TRP2 initiating a temporary change in a mode of operation. For instance, the temporary change in the mode of operation may be a communication operation mode, In some aspects, the temporary change in the mode of operation comprises a backoff window for scheduling UL and/or DL communications with the UE 515. In some aspects, the temporary change in the mode of operation comprises initiating a dynamic coordination with TRP1 for scheduling mTRP UL and/or DL communications with the UE 515. Accordingly, the network, via the TRPs, may adapt to reduce or mitigate further scheduling collisions with the UE 515 based on the UE 515's indication of the scheduling collision.

Referring to actions 566 and 568, in some aspects, the indication provided by the UE 515 may explicitly or implicitly indicate the collision. For instance, the indication may comprise a standardized PUCCH communication or MAC-CE indicating that the second PDSCH was not received, but may not explicitly indicate that the second PDSCH was not received because of a scheduling collision. Accordingly, TRP2 and/or another network unit may determine or infer, based on the UE's implicit indication, that the second PDSCH was not received due to scheduling collisions. In other aspects, the indication from the UE 515 may explicitly indicate the scheduling collision. For instance, the UE 515 may provide a more detailed report than a standard ACK/ NACK indicating one or more aspects of the collision.

Figure 6:
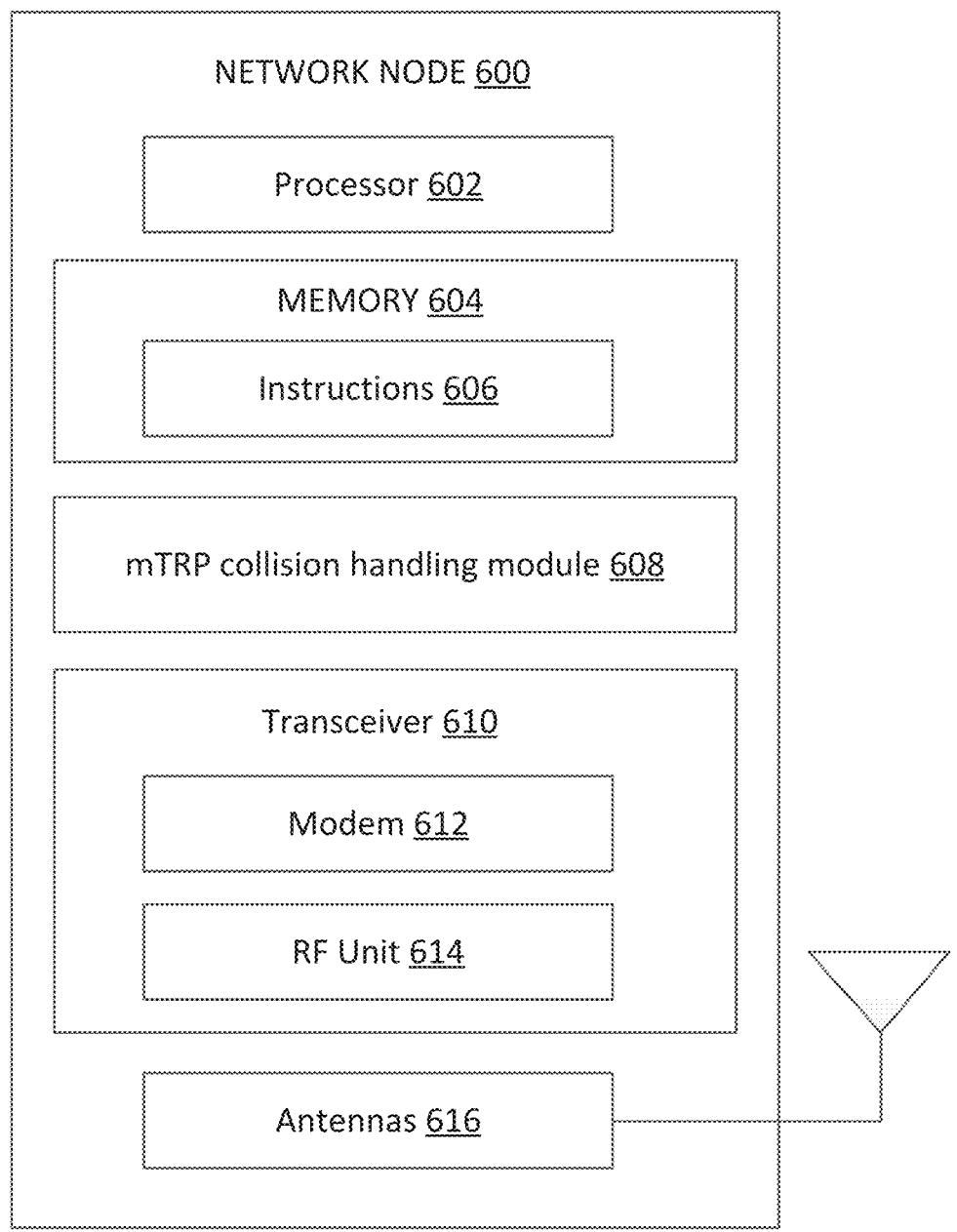
FIG. 6 illustrates a block diagram of a network node according to some aspects of the present disclosure.

FIG. 6 is a block diagram of an exemplary Network Unit 600 according to some aspects of the present disclosure. The Network Unit 600 may be a BS 105 as discussed in FIG. 1A, and/or a TRP as discussed in FIGS. 2 and 5. For example, the Network Unit 600 may be configured as one of multiple TRPs in a network configured for communication with at least one UE, such as one of the UEs 115, 215, 515, and/or 700. As shown, the Network Unit 600 may include a processor 602, a memory 604, a mTRP collision handling module 608, a transceiver 610 including a modem subsystem 612 and a RF unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 2 and 5. Instructions 606 may also be referred to as program code. The program code may be for causing a wireless communication device to perform these operations, for example by causing one or more processors (such as processor 602) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The mTRP collision handling module 608 may be implemented via hardware, software, or combinations thereof. For example, the mTRP collision handling module 608 may be implemented as a processor, circuit, and/or instructions 606 stored in the memory 604 and executed by the processor 602. In some examples, the mTRP collision handling module 608 can be integrated within the modem subsystem 612. For example, the mTRP collision handling module 608 can be implemented by a combination of software components (e.g., executed by a DSP or a general processor) and hardware components (e.g., logic gates and circuitry) within the modem subsystem 612. The mTRP collision handling module 608 may communicate with one or more components of Network Unit 600 to implement various aspects of the present disclosure, for example, aspects of FIGS. 2 and 5.

In some aspects, the mTRP collision handling module 608 is configured to transmit, to a UE, a first mDCI indicating a first reserved resource for a first communication. The first communication may be a DL communication or a UL communication. For instance, the first communication may include a PDSCH communication, PDCCH communication, PUSCH communication, PUCCH communication, and/or any other suitable type of communication. In some aspects, the mTRP collision handling module 608 is configured to receive, from the UE, an indication that the UE did not communicate the first communication. In some aspects, transmitting the indication comprises transmitting the indication to the first network node. In another example, the UE may transmit the indication to another network node, such as the second network node. In some aspects, transmitting the indication may comprise transmitting a NACK indicating that the first communication was dropped. In some aspects, transmitting the indication comprises transmitting a PUCCH communication, such as a format 0 PUCCH or a format 2 PUCCH. However, any suitable uplink communication may be used, including format 1, 3, and 4 PUCCH to report the indication. In other embodiments, transmitting the indication may comprise the UE using higher-layer signaling to transmit the indication, such as a MAC-CE. In some aspects, a specialized PUCCH format may be used, where the PUCCH format includes at least one field indicating that the UE dropped the first communication. In some aspects, the PUCCH may include at least one field indicating which UE capability was associated with the UE's decision to drop the first communication. In some aspects, the indication comprises a NACK indicating a scheduling collision involving the first communication for at least the first reserved resource at the UE In some aspects, the mTRP collision handling module 608 is configured to initiate, based on the indication, a temporary change in a mode of operation of the first network node to reduce scheduling collisions at the UE. In some aspects, the mTRP collision handling module 608 is configured to initiate a temporary backoff window during which the network node 600 refrains from scheduling communications for the UE. In some aspects, the mTRP collision handling module 608 is configured to initiate a dynamic coordination with a second network node for scheduling mTRP communications with the UE.

In some aspects, the mTRP collision handling module 608 may be configured to perform one or more aspects of the methods 500 and/or 550.

As shown, the transceiver 610 may include the modem subsystem 612 and the RF unit 614. The transceiver 610 can be configured to communicate bi-directionally with other devices, such as the UEs 115 and/or Network Unit 600 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., RRC table(s) for channel access configurations, scheduling grants, channel access configuration activation, RRC configurations, PDSCH data, PDCCH DCI, etc.) from the modem subsystem 612 (on outbound transmissions) or of transmissions originating from another source such as a UE 115, 215, and/or UE 700. The RF unit 614 may be further configured to perform analog beamforming in conjunction with the digital beamforming. Although shown as integrated together in transceiver 610, the modem subsystem 612 and/or the RF unit 614 may be separate devices that are coupled together at the Network Unit 600 to enable the Network Unit 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices and provide the received data messages for processing and/or demodulation at the transceiver 610. The transceiver 610 may provide the demodulated and decoded data (e.g., channel sensing reports, PUCCH UCI, PUSCH data, etc.) to the mTRP collision handling module 608 for processing. The antennas 616 may include multiple antennas of similar or different designs in order to sustain multiple transmission links.

In an aspect, the Network Unit 600 can include multiple transceivers 610 implementing different RATs (e.g., NR and LTE). In an aspect, the Network Unit 600 can include a single transceiver 610 implementing multiple RATs (e.g., NR and LTE). In an aspect, the transceiver 610 can include various components, where different combinations of components can implement different RATs.

Further, in some aspects, the processor 602 is coupled to the memory 604 and the transceiver 610. The processor 602 is configured to communicate, with a second wireless communication device via the transceiver 610, a plurality of channel access configurations. The processor 602 is further configured to communicate, with the second wireless communication device via the transceiver 610, a scheduling grant for communicating a communication signal in an unlicensed band, where the scheduling grant includes an indication of a first channel access configuration of the plurality of channel access configurations. The processor 602 is further configured to communicate, with the second wireless communication device in the unlicensed band via the transceiver 610 based on the first channel access configuration, the communication signal.

Figure 7:
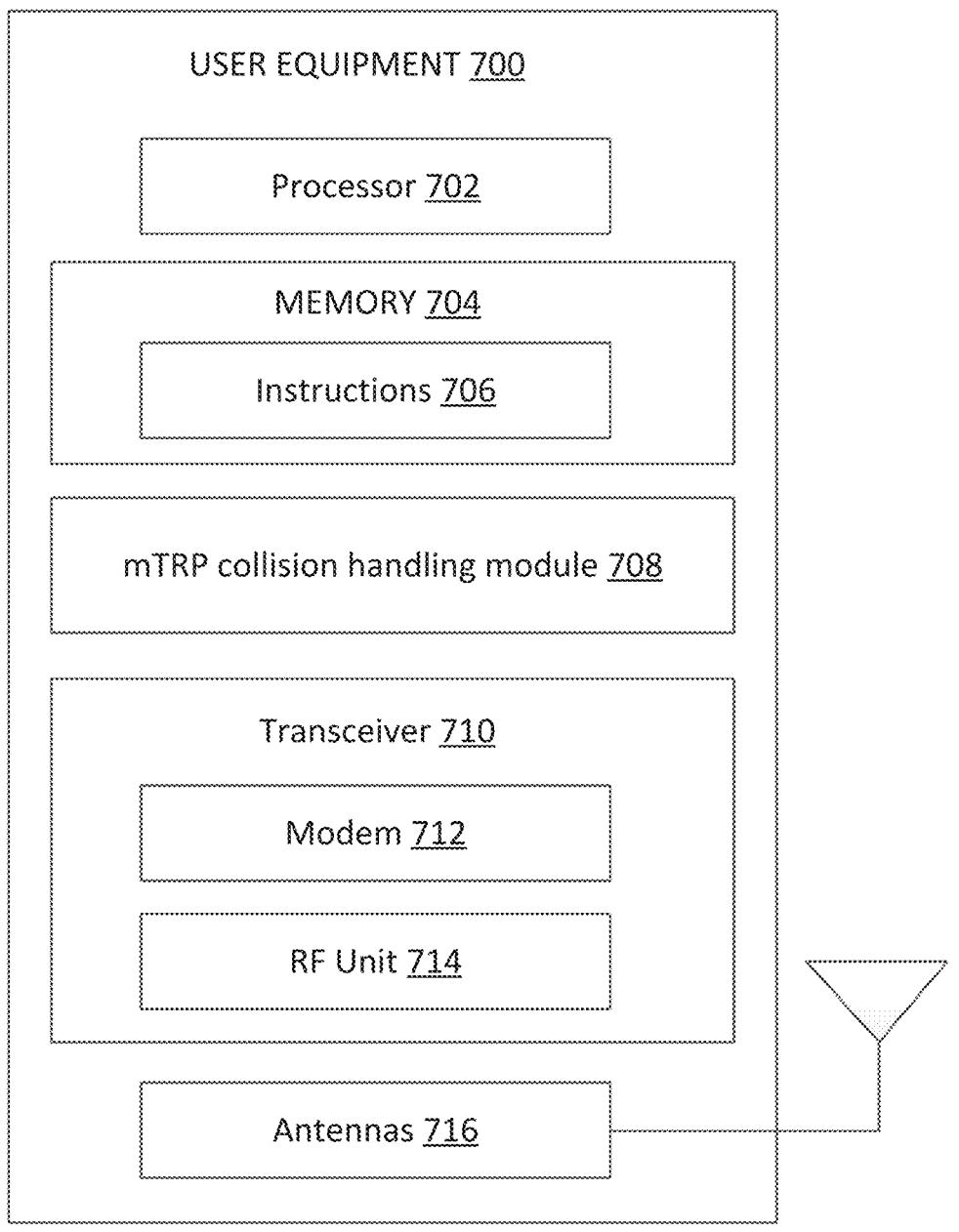
FIG. 7 illustrates a block diagram of a user equipment (UE) according to some aspects of the present disclosure.

FIG. 7 is a block diagram of an exemplary UE 700 according to some aspects of the present disclosure. The UE 700 may be a UE 115 as discussed in FIG. 1A or a UE 215 as discussed in FIG. 2, or the UE 515 as discussed in FIG. 5. As shown, the UE 700 may include a processor 702, a memory 704, a mTRP collision handling module 708, a transceiver 710 including a modem subsystem 712 and a radio frequency (RF) unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to a UE 115 or an anchor in connection with aspects of the present disclosure, for example, aspects of FIGS. 2 and 5. Instructions 706 may also be referred to as code, which may be interpreted broadly to include any type of computer-readable statement(s) as discussed above with respect to FIG. 9.

The mTRP collision handling module 708 may be implemented via hardware, software, or combinations thereof. For example, the mTRP collision handling module 708 may be implemented as a processor, circuit, and/or instructions 706 stored in the memory 704 and executed by the processor 702. In some aspects, the mTRP collision handling module 708 can be integrated within the modem subsystem 712. For example, the mTRP collision handling module 708 can be implemented by a combination of software components (e.g., executed by a DSP or a general processor) and hardware components (e.g., logic gates and circuitry) within the modem subsystem 712. The mTRP collision handling module 708 may communicate with one or more components of UE 700 to implement various aspects of the present disclosure, for example, aspects of FIGS. 2 and 5.

In some aspects, the mTRP collision handling module 708 is configured to receive, from a first network node, a first mDCI indicating a first reserved resource. In some aspects, the mTRP collision handling module 708 is configured to receive, from a second network node, a second mDCI indicating a second reserved resource. In some aspects, the mTRP collision handling module 708 is configured to refrain, based on the first reserved resource, the second reserved resource, and a capability of the UE, from communicating a first communication in the first reserved resource. The capability of the UE may be associated with a capability of the UE to receive DL communications simultaneously, or to transmit UL communications simultaneously. In some aspects, the mTRP collision handling module 708 is configured to communicate a second communication in the second reserved resource. In some aspects, the mTRP collision handling module 708 is configured to transmit, based on the refraining, an indication that the UE did not communicate the first communication. In some aspects, the mTRP collision handling module 708 is configured to transmit the indication to the first network node. In some aspects, the mTRP collision handling module 708 is configured to transmit at least one of a NACK associated with the first communication or a MAC-CE associated with the first communication.

In some aspects, the mTRP collision handling module 708 may be configured to perform one or more aspects of the methods 500 and/or 550.

As shown, the transceiver 710 may include the modem subsystem 712 and the RF unit 714. The transceiver 710 can be configured to communicate bi-directionally with other devices, such as a BS 105 and/or a network node 600. The modem subsystem 712 may be configured to modulate and/or encode the data from the memory 704 and/or the mTRP collision handling module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., channel sensing reports, PUCCH UCI, PUSCH data, etc.) or of transmissions originating from another source such as a UE 115, a BS 105, or an anchor. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 700 to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., RRC table(s) for channel access configurations, scheduling grants, channel access configuration activation, timing advance configurations, RRC configurations, PUSCH configurations, SRS resource configurations, PUCCH configurations, BWP configurations, PDSCH data, PDCCH DCI, etc.) to the mTRP collision handling module 708 for processing. The antennas 716 may include multiple antennas of similar or different designs in order to sustain multiple transmission links.

In an aspect, the UE 700 can include multiple transceivers 710 implementing different RATs (e.g., NR and LTE). In an aspect, the UE 700 can include a single transceiver 710 implementing multiple RATs (e.g., NR and LTE). In an aspect, the transceiver 710 can include various components, where different combinations of components can implement different RATs.

Further, in some aspects, the processor 702 is coupled to the memory 704 and the transceiver 710. The processor 702 may be further configured to detect a mTRP scheduling collision based on one or more UE capabilities, and to select a communication to drop.

FIG. 8 is a flow diagram illustrating a wireless communication method 800 according to some aspects of the present disclosure. Aspects of the method 800 can be executed by a computing device (e.g., a processor, processing circuit, and/or other suitable component) of a wireless communication device or other suitable means for performing the blocks. In one aspect, a UE, such as one of the UEs 115, 515, and/or 700, may utilize one or more components, such as the processor 702, the memory 704, the mTRP collision handling module 708, the transceiver 710, the modem 712, the RF unit 714, and the one or more antennas 716, to execute the blocks of method 800. The method 800 may employ similar mechanisms as described in FIGS. 5A and/or 5B. In some aspects, the method may be performed with two or more network nodes. The network nodes may include aggregated BSs and/or disaggregated BSs as described above with respect to FIGS. 1A and 1B. The network nodes may be configured as transmission-reception points (TRPs) in a mTRP communication scenario. Accordingly, aspects of the method 800 may be described with reference to one or more TRPs and one or more UEs. As illustrated, the method 800 includes a number of enumerated blocks, but aspects of the method 800 may include additional blocks before, after, and in between the enumerated blocks. In some aspects, one or more of the enumerated blocks may be omitted or performed in a different order.

At block 810, the UE receives, from a first network node, a first mDCI indicating a first reserved resource. In some aspects, the first reserved resource may be associated with a first communication. The first reserved resource may be for a DL communication, or a UL communication. For instance, the first reserved resource may be associated with a scheduled PDSCH communication, PDCCH communication, PUSCH communication, PUCCH communication, and/or any other suitable type of communication.

At block 820, the UE receives, from a second network node, a second mDCI indicating a second reserved resource. The second reserved resource may be for a DL communication, or a UL communication. For instance, the second reserved resource may be associated with a scheduled PDSCH communication, PDCCH communication, PUSCH communication, PUCCH communication, and/or any other suitable type of communication.

At block 830, the UE refrains, based on the first reserved resource, the second reserved resource, and a capability of the UE, from communicating a first communication in the first reserved resource. In some aspects, the UE refrains from communicating the first communication based on detecting a scheduling collision involving the first communication and the second communication. For instance, in some aspects, the method may include the UE detecting the collision based on a determination that the first communication and the second communication would exceed or violate the capability of the UE. The UE capability may be associated with at capability or configuration to receive time-overlapping DL communications, or to transmit time-overlapping UL communications, as further explained below.

In some aspects, refraining from communicating the first communication comprises refraining from receiving a DL communication. For instance, refraining from receiving the DL communication may comprise refraining from receiving a PDSCH communication and/or a PDCCH communication. In some aspects, the capability of the UE may comprise a capability of the UE to receive unicast PDSCH transmissions. In some aspects, the capability of the UE may comprise a capability of the UE to receive time-domain overlapping PDSCH transmissions. For instance, the capability may include an inability to receive PDSCH transmissions that overlap in time. In other aspects, the capability may include a limited or conditional ability to receive PDSCH transmissions that overlap in time. In one example, the capability may include a capability to receive time-overlapping PDSCH communications provided that the PDSCH communications do not overlap in frequency. In some aspects, the capability may comprise a capability to receive unicast PDSCH transmissions subject to one or more of a total received PDSCH rank limitation, a per-PDSCH transmission rank limitation, a combined PDSCH TBS limitation, or a per-PDSCH TBS limitation. In some aspects, the rank limitation may be referred to as a PDSCH transmission rank capability. For instance, the UE may be capable of receiving two DL transmissions simultaneously provided that the rank of each DL transmission is less than a configured threshold. In another example, the UE may be capable of receiving two DL transmissions simultaneously provided that the total aggregate ranks of the two DL transmissions is less than a configured threshold. In another example, the UE may be capable of receiving two DL transmissions simultaneously provided that the TBS of each DL transmission is less than a configured threshold. In still another example, the UE may be capable of receiving two DL transmissions simultaneously provided that the total combined TBS of the two DL transmissions is less than a configured threshold.

In some aspects, refraining from communicating the first communication comprises refraining from transmitting a UL communication. For instance, refraining from transmitting the UL communication may comprise refraining from transmitting a PUSCH communication and/or a PUCCH communication. In some aspects, the capability of the UE may comprise a capability of the UE to transmit time-domain overlapping UL transmissions. For instance, the capability may include an inability to transmit UL communications that overlap in time. In other aspects, the capability may include a limited or conditional ability to transmit transmissions that overlap in time. In some aspects, the capability may comprise a capability to transmit UL communications based on the channel type. For instance, the UE capability may be associated with an inability to simultaneously transmit PUCCH and PUSCH communications. In another example, the capability may comprise a capability of the UE to simultaneously transmit UL communications that overlap in frequency. For instance, in some aspects, the capability may be associated with an inability to transmit UL communications that overlap in time and frequency. In another example, the capability may include a capability for simultaneously transmitting UL communications with a total combined rank limitation. For instance, the UE may be capable of simultaneously transmitting UL communications provided that the total aggregate ranks of the UL communications are below a configured threshold.

At block 840, the UE communicates a second communication in the second reserved resource. In some aspects, the communicating the second communication is based on a determination or selection of one of the communications to drop. In some aspects, the UE selects which communication to communicate, and/or which communication to drop, based on the resources associated with each communication. In one example selects the communication to transmit or receive based on which one is scheduled to be transmitted or received first. In another aspect, the UE may select which communication to communicate and which to drop based on a rank, TBS, and/or priority associated with the scheduled communications. In another aspect, the UE may prioritize PUCCH communications over PUSCH communications. In another aspect, the UE may prioritize PUSCH communications over PUCCH communications. In another aspect, the UE may prioritize one of the communications based on its content. For example, the UE may prioritize a PUCCH communication carrying HARQ-ACK feedback over a PUSCH communication. In another aspect, the UE may prioritize a PUSCH communication having a priority index that meets or exceeds a given threshold over a PUCCH communication.

In some aspects, communicating the second communication comprises receiving a DL communication. For instance, receiving the DL communication may comprise receiving a PDSCH communication and/or a PDCCH communication. In some aspects, receiving the DL communication may comprise monitoring for, decoding, and/or otherwise processing the DL communication. In another aspect, communicating the second communication comprises transmitting a UL communication. For instance, transmitting the UL communication may comprise transmitting a PUSCH communication and/or a PUCCH communication. In some aspects, the UE transmits the UL communication to the second network node.

At block 850, the UE transmits, based on the refraining from communicating the first communicating, an indication that the UE did not communicate the first communication. In some aspects, transmitting the indication comprises transmitting the indication to the first network node. In another example, the UE may transmit the indication to another network node, such as the second network node. In some aspects, transmitting the indication may comprise transmitting a NACK indicating that the first communication was dropped. In some aspects, transmitting the indication comprises transmitting a PUCCH communication, such as a format 0 PUCCH or a format 2 PUCCH. However, any suitable uplink communication may be used, including format 1, 3, and 4 PUCCH to report the indication. In other embodiments, transmitting the indication may comprise the UE using higher-layer signaling to transmit the indication, such as a MAC-CE. In some aspects, a specialized PUCCH format may be used, where the PUCCH format includes at least one field indicating that the UE dropped the first communication. In some aspects, the PUCCH may include at least one field indicating which UE capability was associated with the UE's decision to drop the first communication. In some aspects, the indication comprises a NACK indicating a scheduling collision involving the first communication for at least the first reserved resource at the UE.

The method 800 may include one or more steps, actions, or other aspects illustrated in FIGS. 5A and/or 5B and described above.

FIG. 9 is a flow diagram illustrating a wireless communication method 900 according to some aspects of the present disclosure. Aspects of the method 900 can be executed by a computing device (e.g., a processor, processing circuit, and/or other suitable component) of a wireless communication device or other suitable means for performing the blocks. In one aspect, a network node, such as one of the BSs 105 and/or the network node 600, may utilize one or more components, such as the processor 602, the memory 604, the mTRP collision handling module 608, the transceiver 610, the modem 612, the RF unit 614, and the one or more antennas 616, to execute the blocks of method 900. The method 900 may employ similar mechanisms as described in FIGS. 5A and/or 5B. In some aspects, the method may involve a UE and at least one other network node. The network nodes may include aggregated BSs and/or disaggregated BSs as described above with respect to FIGS. 1A and 1B. The network nodes may be configured as transmission-reception points (TRPs) in a mTRP communication scenario. Accordingly, aspects of the method 900 may be described with reference to one or more TRPs and one or more UEs. As illustrated, the method 900 includes a number of enumerated blocks, but aspects of the method 900 may include additional blocks before, after, and in between the enumerated blocks. In some aspects, one or more of the enumerated blocks may be omitted or performed in a different order.

At block 910, a first network node transmits, to a UE, a first mDCI indicating a first reserved resource for a first communication. The first communication may be a DL communication or a UL communication. For instance, the first communication may include a PDSCH communication, PDCCH communication, PUSCH communication, PUCCH communication, and/or any other suitable type of communication.

At block 920, the first network node receives, from the UE, an indication that the UE did not communicate the first communication. In some aspects, transmitting the indication comprises transmitting the indication to the first network node. In another example, the UE may transmit the indication to another network node, such as the second network node. In some aspects, transmitting the indication may comprise transmitting a NACK indicating that the first communication was dropped. In some aspects, transmitting the indication comprises transmitting a PUCCH communication, such as a format 0 PUCCH or a format 2 PUCCH.

However, any suitable uplink communication may be used, including format 1, 3, and 4 PUCCH to report the indication. In other embodiments, transmitting the indication may comprise the UE using higher-layer signaling to transmit the indication, such as a MAC-CE. In some aspects, a specialized PUCCH format may be used, where the PUCCH format includes at least one field indicating that the UE dropped the first communication. In some aspects, the PUCCH may include at least one field indicating which UE capability was associated with the UE's decision to drop the first communication. In some aspects, the indication comprises a NACK indicating a scheduling collision involving the first communication for at least the first reserved resource at the UE.

At block 930, the first network node initiates, based on the indication, a temporary change in a mode of operation of the first network node to reduce scheduling collisions at the UE. In some aspects, the temporary change in the mode of operation may include initiating a temporary backoff window during which the TRP refrains from scheduling communications for the UE. In some aspects, initiating the temporary change in the mode of operation comprises initiating a dynamic coordination with the second network node for scheduling mTRP communications with the UE. Accordingly, the network, via the network nodes, may adapt to reduce or mitigate further scheduling collisions with the UE based on the UE's indication of the scheduling collision.

The method 900 may include one or more steps, actions, or other aspects illustrated in FIGS. 5A and/or 5B and described above.

Exemplary Aspects of the Disclosure

Aspect 1. A method of wireless communication performed by a user equipment (UE), the method comprising: receiving, from a first network node, a first multi-downlink control information (mDCI) indicating a first reserved resource; receiving, from a second network node, a second mDCI indicating a second reserved resource; refraining, based on the first reserved resource, the second reserved resource, and a capability of the UE, from communicating a first communication in the first reserved resource; communicating a second communication in the second reserved resource; and transmitting, based on the refraining, an indication that the UE did not communicate the first communication.

Aspect 2. The method of aspect 1, wherein the capability of the UE comprises a capability of the UE to receive unicast physical downlink shared channel (PDSCH) transmissions.

Aspect 3. The method of aspect 2, wherein the capability of the UE to receive unicast PDSCH transmissions comprises at least one of: a capability of the UE to receive time-domain overlapping PDSCH transmissions; a total received PDSCH rank capability; a per-PDSCH transmission rank capability; a capability of the UE to receive PDSCH transmissions that overlap in frequency; a capability for total received PDSCH transport block (TB) during a time period; or a per-PDSCH transmission TB capability.

Aspect 4. The method of aspect 1, wherein the capability of the UE comprises a capability of the UE to transmit physical uplink control channel (PUCCH) transmissions.

Aspect 5. The method of aspect 4, wherein the capability of the UE comprises at least one of: a capability of the UE to transmit PUCCH transmissions that overlap in time; or a capability of the UE to transmit a PUCCH transmission and a physical uplink shared channel (PUSCH) transmission that overlap in time.

Aspect 6. The method of aspect 1, wherein the capability of the UE comprises a capability of the UE to transmit physical uplink shared channel (PUSCH) transmissions.

Aspect 7. The method of aspect 6, wherein the capability of the UE comprises at least one of: a capability of the UE to transmit PUSCH transmissions that overlap in time; a capability of the UE to transmit PUSCH transmissions that overlap in frequency; or a total PUSCH transmission rank capability.

Aspect 8. The method of any of aspects 1-7, wherein the transmitting the indication comprises transmitting the indication to the first network node.

Aspect 9. The method of any of aspects 1-8, wherein the transmitting the indication comprises transmitting at least one of a non-acknowledgement (NACK) associated with the first communication or a media access control-control element (MAC-CE) associated with the first communication.

Aspect 10. The method of aspect 9, wherein the transmitting the indication comprises transmitting the NACK, the NACK indicating a scheduling collision for at least the first reserved resource at the UE.

Aspect 11. A method of wireless communication performed by a first network node, the method comprising: transmitting, to a user equipment (UE), a first multi-downlink control information (mDCI) indicating a first reserved resource for a first communication; receiving, from the UE, an indication associated with the first reserved resource colliding with a second reserved resource associated with a second network node; and initiating, based on the indication, a temporary change in a mode of operation of the first network node to reduce scheduling collisions at the UE.

Aspect 12. The method of aspect 11, wherein the initiating the temporary change in the mode of operation of the first network node comprises initiating a backoff window for scheduling communications with the UE.

Aspect 13. The method of any of aspects 11-12, wherein the initiating the temporary change in the mode of operation of the first network node comprises coordinating with the second network node to schedule multi-transmission reception point (mTRP) communications with the UE.

Aspect 14. The method of any of aspects 11-13, wherein the receiving the indication comprises receiving at least one of a non-acknowledgement (NACK) associated with the first communication, or a media access control-control element (MAC-CE) associated with the first communication.

Aspect 15. The method of aspect 14, wherein the receiving the indication comprises receiving the NACK, the NACK indicating a scheduling collision for at least the first reserved resource at the UE.

Aspect 16. A user equipment (UE) comprising a transceiver, a memory device, and a processor in communication with the transceiver and the memory device, wherein the UE is configured to perform the actions of any of aspects 1-10.

Aspect 17. A first network node comprising a transceiver, a memory device, and a processor in communication with the transceiver and the memory device, wherein the first network node is configured to perform the actions of any of aspects 11-15.

Aspect 18. A non-transitory, computer-readable medium having program code recorded thereon, wherein the program code comprises instructions executable by a processor of a UE to cause the UE to perform the actions of any of aspects 1-10.

Aspect 19. A non-transitory, computer-readable medium having program code recorded thereon, wherein the program code comprises instructions executable by a processor of a first network node to cause the first network node to perform the actions of any of aspects 11-15.

Aspect 20. A UE comprising means for performing the actions of any of aspects 1-10.

Aspect 21. A first network node comprising means for performing the actions of any of aspects 11-15.

For the purposes of the present disclosure, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

receiving, from a first network node, a first multi-downlink control information (mDCI) scheduling a first communication associated with a first transmit receive point (TRP) in a first reserved resource;

receiving, from a second network node, a second mDCI scheduling a second communication associated with a second TRP in a second reserved resource;

detecting a collision or a conflict between the first communication and the second communication based on a capability of the UE to receive or transmit a plurality of communications that overlap in at least one of time or frequency;

refraining, based on detecting the collision or the conflict, from communicating the first communication in the first reserved resource;

communicating the second communication in the second reserved resource; and transmitting, based on the refraining, an indication that the UE did not communicate the first communication.

2. The method of claim 1, wherein the plurality of communications comprises a plurality of unicast physical downlink shared channel (PDSCH) transmissions, and wherein the capability of the UE comprises a capability of the UE to receive the plurality of unicast PDSCH transmissions.

3. The method of claim 2, wherein the capability of the UE to receive the plurality of unicast PDSCH transmissions comprises at least one of:

a capability of the UE to receive the plurality of unicast PDSCH transmissions that overlap in time;

a total received PDSCH rank capability;

a per-PDSCH transmission rank capability;

a capability of the UE to receive the plurality of unicast PDSCH transmissions that overlap in frequency;

a capability for total received PDSCH transport block (TB) during a time period; or a per-PDSCH transmission TB capability.

4. The method of claim 1, wherein the plurality of communications comprises a plurality of physical uplink control channel (PUCCH) transmissions, and wherein the capability of the UE comprises a capability of the UE to transmit the plurality of PUCCH transmissions.

5. The method of claim 4, wherein the capability of the UE to transmit the plurality of PUCCH transmissions comprises at least one of:

a capability of the UE to transmit the plurality of PUCCH transmissions that overlap in time; or a capability of the UE to transmit a PUCCH transmission, of the plurality of PUCCH transmissions, and a physical uplink shared channel (PUSCH) transmission that overlap in time.

6. The method of claim 1, wherein the plurality of communications comprises a plurality of physical uplink shared channel (PUSCH) transmissions, and wherein the capability of the UE comprises a capability of the UE to transmit the plurality of PUSCH transmissions.

7. The method of claim 6, wherein the capability of the UE to transmit the plurality of PUSCH transmissions comprises at least one of:

a capability of the UE to transmit the plurality of PUSCH transmissions that overlap in time;

a capability of the UE to transmit the plurality of PUSCH transmissions that overlap in frequency; or a total PUSCH transmission rank capability.

8. The method of claim 1, wherein transmitting the indication comprises:

transmitting the indication to the first network node.

9. The method of claim 1, wherein transmitting the indication comprises:

transmitting at least one of a non-acknowledgement (NACK) associated with the first communication, or a media access control-control element (MAC-CE) associated with the first communication.

10. The method of claim 9, wherein the indication comprises the NACK, the NACK indicating a scheduling collision for at least the first reserved resource at the UE.

11. A method of wireless communication performed by a first network node, the method comprising:

transmitting, to a user equipment (UE), a first multi-downlink control information (mDCI) scheduling a first communication associated with a first transmit receive point (TRP) in a first reserved resource;

receiving, from the UE, an indication associated with the first communication colliding or conflicting with a second communication associated with a second reserved resource and a second network node, wherein the indication is received based at least in part on a capability of the UE to receive or transmit a plurality of communications that overlap in at least one of time or frequency; and initiating, based on the indication, a temporary change in a mode of operation of the first network node to reduce scheduling collisions at the UE.

12. The method of claim 11, wherein initiating the temporary change in the mode of operation of the first network node comprises:

initiating a backoff window for scheduling communications with the UE.

13. The method of claim 11, wherein initiating the temporary change in the mode of operation of the first network node comprises:

adjusting a communication operating mode or a communication operating condition of the first network node to reduce scheduling collisions at the UE.

14. The method of claim 11, wherein receiving the indication comprises:

receiving at least one of a non-acknowledgement (NACK) associated with the first communication, or a media access control-control element (MAC-CE) associated with the first communication.

15. The method of claim 14, wherein the indication comprises the NACK, the NACK indicating the first communication colliding or conflicting with the second communication at the UE.

16. A user equipment (UE), comprising:

one or more memories; and one or more processors, coupled to the one or more memories, configured to cause the UE to:

receive, from a first network node, a first multi-down-link control information (mDCI) scheduling a first communication associated with a first transmit receive point (TRP) in a first reserved resource;

receive, from a second network node, a second mDCI scheduling a second communication associated with a second TRP in a second reserved resource;

detect a collision or a conflict between the first communication and the second communication based on a capability of the UE to receive or transmit a plurality of communications that overlap at least one of time or frequency;

refrain, based on detecting the collision or the conflict, from communicating the first communication in the first reserved resource;

communicate the second communication in the second reserved resource; and transmit, based on the refraining, an indication that the UE did not communicate the first communication.

17. The UE of claim 16, wherein the plurality of communications comprises a plurality of unicast physical downlink shared channel (PDSCH) transmissions, and wherein the capability of the UE comprises a capability of the UE to receive the plurality of unicast PDSCH transmissions.

18. The UE of claim 17, wherein the capability of the UE to receive the plurality of unicast PDSCH transmissions comprises at least one of:

a capability of the UE to receive the plurality of unicast PDSCH transmissions that overlap in time;

a total received PDSCH rank capability;

a per-PDSCH transmission rank capability;

a capability of the UE to receive the plurality of unicast PDSCH transmissions that overlap in frequency;

a capability for total received PDSCH transport block (TB) during a time period; or a per-PDSCH transmission TB capability.

19. The UE of claim 16, wherein the plurality of communications comprises a plurality of physical uplink control channel (PUCCH) transmissions, and wherein the capability of the UE comprises a capability of the UE to transmit the plurality of PUCCH transmissions.

20. The UE of claim 19, wherein the capability of the UE to transmit the plurality of PUCCH transmissions comprises at least one of:

a capability of the UE to transmit the plurality of PUCCH transmissions that overlap in time; or a capability of the UE to transmit a PUCCH transmission, of the plurality of PUCCH transmissions, and a physical uplink shared channel (PUSCH) transmission that overlap in time.

21. The UE of claim 16, wherein the capability of the UE is associated with receiving or transmitting a plurality of transmissions, and wherein the capability of the UE comprises a capability of the UE to transmit the plurality of PUSCH transmissions.

22. The UE of claim 21, wherein the capability of the UE to transmit the plurality of PUSCH transmissions comprises at least one of:

a capability of the UE to transmit the plurality of PUSCH transmissions that overlap in time;

a capability of the UE to transmit the plurality of PUSCH transmissions that overlap in frequency; or a total PUSCH transmission rank capability.

23. The UE of claim 16, wherein, to transmit the indication, the one or more processors are configured to cause the UE to:

transmit the indication to the first network node.

24. The UE of claim 16, wherein, to transmit the indication, the one or more processors are configured to cause the UE to:

transmit at least one of a non-acknowledgement (NACK) associated with the first communication, or a media access control-control element (MAC-CE) associated with the first communication.

25. The UE of claim 24, wherein the indication comprises the NACK, the NACK indicating a scheduling collision for at least the first reserved resource at the UE.

26. A first network node, comprising:

one or more memories; and one or more processors, coupled to the one or more memories, configured to cause the first network node to:

transmit, to a user equipment (UE), a first multi-downlink control information (mDCI) scheduling a first communication associated with a first transmit receive point (TRP) in a first reserved resource;

receive, from the UE, an indication associated with the first communication colliding or conflicting with a second communication associated with a second reserved resource and a second network node, wherein the indication is received based at least in part on a capability of the UE to receive or transmit a plurality of communications that overlap in at least one of time or frequency; and initiate, based on the indication, a temporary change in a mode of operation of the first network node to reduce scheduling collisions at the UE.

27. The first network node of claim 26, wherein, to initiate the temporary change in the mode of operation of the first network node, the one or more processors are configured to cause the first network node to:

initiate a backoff window for scheduling communications with the UE.

28. The first network node of claim 26, wherein, to initiate the temporary change in the mode of operation of the first network node, the one or more processors are configured to cause the first network node to:

adjust a communication operating mode or a communication operating condition of the first network node to reduce scheduling collisions at the UE.

29. The first network node of claim 26, wherein, to receive the indication, the one or more processors are configured to cause the first network node to:

receive at least one of a non-acknowledgement (NACK) associated with the first communication, or a media access control-control element (MAC-CE) associated with the first communication.

30. The first network node of claim 29, wherein the indication comprises the NACK, the NACK indicating the first communication colliding or conflicting with the second communication at the UE.

* * * * *